(12) United States Patent
Shirouzu et al.

(10) Patent No.: US 11,015,322 B2
(45) Date of Patent: May 25, 2021

(54) CONTROL DEVICE FOR HYDRAULIC MACHINE

(71) Applicant: Yanmar Co., Ltd., Osaka (JP)

(72) Inventors: Takayuki Shirouzu, Chikugo (JP); Hiroshi Matsuyama, Chikugo (JP); Masahiro Itani, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 0 days.

(21) Appl. No.: 16/604,111

(22) PCT Filed: Apr. 9, 2018

(86) PCT No.: PCT/JP2018/014920
§ 371 (c)(1),
(2) Date: Oct. 9, 2019

(87) PCT Pub. No.: WO2018/190295
PCT Pub. Date: Oct. 18, 2018

(65) Prior Publication Data
US 2020/0040553 A1    Feb. 6, 2020

(30) Foreign Application Priority Data

Apr. 10, 2017    (JP) ............................. JP2017-077859

(51) Int. Cl.
*E02F 9/22* (2006.01)
*F02D 29/04* (2006.01)
(Continued)

(52) U.S. Cl.
CPC .............. *E02F 9/2235* (2013.01); *E02F 9/22* (2013.01); *E02F 9/2228* (2013.01); *F02D 29/04* (2013.01);
(Continued)

(58) Field of Classification Search
CPC .......... E02F 9/22; E02F 9/2228; F02D 29/04; B60W 2710/0644; F04B 1/324; F04B 49/00; F04B 2203/0209; F15B 11/00
(Continued)

(56) References Cited

U.S. PATENT DOCUMENTS

| | | | |
|---|---|---|---|
| 6,183,210 B1* | 2/2001 | Nakamura | E02F 9/2235 417/222.1 |
| 2017/0037601 A1* | 2/2017 | Takahashi | E02F 9/2285 |
| 2019/0285093 A1* | 9/2019 | Muraoka | E02F 3/435 |

FOREIGN PATENT DOCUMENTS

| | | |
|---|---|---|
| JP | H2-076904 A | 3/1990 |
| JP | H4-285302 A | 10/1992 |

(Continued)

OTHER PUBLICATIONS

JP2012241742A (Takahashi et al.) Dec. 10, 2012 (machine translation) [online] (retrieved on Sep. 22, 2020] Retried from EPO website. (Year: 2012).*

(Continued)

*Primary Examiner* — Mahmoud Gimie
(74) *Attorney, Agent, or Firm* — Norton Rose Fulbright US LLP

(57) ABSTRACT

A control device for a hydraulic machine such as a revolving excavator work machine having a structure that can cope with such an engine output decreasing environment as a work under a low atmospheric pressure at a high altitude without generating noise caused by engine rotation number increase. The control device corrects a control output value to be applied to an electromagnetic proportional valve for load-sensing valve control in a load-sensing type pump control system, based on a detected state quantity related to the engine output decreasing environment. When an engine speed-sensitive pump control system is adopted, a control output value generated based on a detected decrease in the (Continued)

actual engine rotation number is combined with a control output value generated by the load-sensing type pump control system.

5 Claims, 8 Drawing Sheets

(51) Int. Cl.
 *F04B 1/324* (2020.01)
 *F04B 49/00* (2006.01)
 *F15B 11/00* (2006.01)
(52) U.S. Cl.
 CPC ...... *B60W 2710/0644* (2013.01); *F04B 1/324* (2013.01); *F04B 49/00* (2013.01); *F04B 2203/0209* (2013.01); *F15B 11/00* (2013.01)
(58) Field of Classification Search
 USPC .......................................................... 123/386
 See application file for complete search history.

(56) References Cited

FOREIGN PATENT DOCUMENTS

| | | | |
|---|---|---|---|
| JP | H07-158605 | A | 6/1995 |
| JP | H11-101183 | A | 4/1999 |
| JP | 3383754 | B2 | 3/2003 |
| JP | 2004-132197 | A | 4/2004 |
| JP | 2005-233120 | A | 9/2005 |
| JP | 2011-196066 | A | 10/2011 |
| JP | 2011-247301 | A | 12/2011 |
| JP | 2012-202219 | A | 10/2012 |
| JP | 2012-241742 | A | 12/2012 |
| JP | 2014-231793 | A | 12/2014 |
| WO | 2012/050136 | A1 | 4/2012 |

OTHER PUBLICATIONS

JP2004132197A (Nishimura et al.) Apr. 30, 2004 (machine translation) [online] (retrieved on Sep. 22, 2020) Retrieved from EPO website. (Year: 2004).*
International Search Report dated Jul. 3, 2018 issued in corresponding PCT Application PCT/JP2018/014920.

* cited by examiner

※ α2=α1*β
※ C2=C1+α2
※ Nd=Ns-Nr
※ C4=C2+C3

CONTROL DEVICE FOR HYDRAULIC MACHINE

CROSS REFERENCES TO RELATED APPLICATIONS

This application is a national stage application pursuant to 35 U.S.C. § 371 of International Application No. PCT/JP2018/014920, filed on Apr. 9, 2018 which claims priority under 35 U.S.C. § 119 to Japanese Patent Application No. 2017-077859 filed on Apr. 10, 2017, the disclosures of which are hereby incorporated by reference in their entireties.

TECHNICAL FIELD

The present invention relates to a control device used for a hydraulic oil supply system for supplying hydraulic oil to a hydraulic actuator that drives a hydraulic machine such as a revolving excavator work machine.

BACKGROUND ART

Conventionally known is a hydraulic oil supply system for a hydraulic actuator that drives a hydraulic machine such as a revolving excavator work machine, the hydraulic oil supply system being configured to supply hydraulic oil ejected from a variable displacement type hydraulic pump to the hydraulic actuator via a direction control valve, as shown in Patent Literatures 1 to 8 (PTL 1 to PTL 8) for example.

Of the above, a control device disclosed in PTL 1 for controlling a pump ejection oil flow rate is configured as a load-sensing type pump control system to adjust the ejection oil amount ejected from a hydraulic pump such that a difference (hereinafter, simply referred to as "differential pressure") between an ejection pressure of the hydraulic pump and a load pressure at a secondary side of a direction control valve (at an inlet port side of the hydraulic actuator) can be constant, by using a load-sensing valve, and on the other hand, the area of opening of a meter-in throttle that narrows a flow channel in the direction control valve from the hydraulic pump to the hydraulic actuator is changed in accordance with the amount of operation on a manual operation tool of the direction control valve. Accordingly, a necessary amount of hydraulic oil corresponding to an operating speed of the actuator set by the manual operation tool is supplied from the direction control valve to the hydraulic actuator. Thus, an operation efficiency of the hydraulic oil supply system can be increased.

PTL 2 and PTL 3 disclose a technique enabling adjustment of a target differential pressure set by a load-sensing valve. More specifically, a controller applies an adjustable control pressure to the ejection pressure of the hydraulic pump, against the load pressure at the load-sensing valve.

Further, if the engine output decreases due to a certain cause and if a reduced engine output torque falls below the suction torque of the hydraulic pump for driving the hydraulic actuator, such a decrease not only may lead to a decrease in the driving speed of the work machine, but also may result in an engine stall. In view of this, a work vehicle such as a traditional excavator work machine adopting an engine speed-sensitive pump control system configured to reduce an ejection amount from the hydraulic pump in response to a decrease in the engine output is publicly known as is indicated in PTL 4 to PTL 6, for example.

However, an amount of air taken in decreases in a higher altitude, and thus a decrease in the engine torque is greater than a decrease at a lower altitude. Therefore, there is a higher possibility of a decrease in the engine rotation number such that even an engine speed-sensitive pump control system is insufficient. To respond to use in a high altitude, PTL 7 and PTL 8 and the like disclose a work vehicle adopting a technique of sensing the atmospheric pressure and the like to recognize a change in the environment, and correcting a minimum engine rotation number according to the change in the environment.

A vehicle of PTL 4 adopts the following means. Namely, an amount of decrease in the engine output due to a change in the environment is calculated as a rotation number correction amount, and at a time of subtracting a target rotation number from an actual rotation number, the rotation number correction amount is further subtracted, so that a target maximum absorption torque in the hydraulic pump is reduced in advance.

CITATION LIST

Patent Literature

PTL 1: Japanese Patent Application Laid-Open No. H4-285302 (1992)
PTL 2: Japanese Patent Application Laid-Open No. H2-76904 (1990)
PTL 3: Japanese Patent Application Laid-Open No. 2011-247301
PTL 4: Japanese Patent Application Laid-Open No. H11-101183 (1999)
PTL 5: Japanese Patent Application Laid-Open No. 2011-196066
PTL 6: Japanese Patent Application Laid-Open No. 2012-202219
PTL 7: PCT International Publication No. WO2012/050136
PTL 8: Japanese Patent Application Laid-Open No. 2014-231793

SUMMARY OF INVENTION

Technical Problem

Suppose that a hydraulic machine as suggested in PTL 2 and PTL 3, adopting a load-sensing type pump control system which applies a control pressure, is used as it is in an environment that may cause a decrease in the engine output, such as a high-altitude environment where the atmospheric pressure is low. The pump control system does not have a configuration assuming a use of the hydraulic machine in such an environment. Therefore, there is a possibility that a problem such as an engine stall or an insufficient rotation number of the engine may take place.

In the work vehicle of PTL 7 and PTL 8, the rotation number of the engine during a low idling state is set high, for use in a high-altitude environment. However, an increase in the low idling rotation number causes a noise, which leads to deterioration of the work environment and deterioration in the fuel efficiency.

In the work vehicle of PTL 4, a maximum absorption torque of the hydraulic pump in the engine speed-sensitive system is reduced, at a time of use in a high-altitude environment. However, in the pump control system of PTL 4, it is necessary to match the engine output torque and hydraulic pump absorption torque, to set the maximum absorption torque of the hydraulic pump, and then to correct the maximum absorption torque at the time of use in a high-altitude environment. On the other hand, since the load-sensing system of PTL 2 and PTL 3 controls the pump flow rate so that the differential pressure is constant, it does not have a concept of setting the maximum absorption torque. Therefore, the control of PTL 4 cannot be adapted to such a load-sensing system.

Solution to Problem

To solve the problems described above, some aspects of the present invention adopt the following means.

An aspect of the present invention is a control device for a hydraulic machine including a plurality of hydraulic actuators that are driven by oil ejected from a variable displacement type hydraulic pump driven by an engine. The control device includes, as means for controlling an ejection amount from the hydraulic pump, pump control means for controlling the hydraulic pump to achieve a target differential pressure which is a target value of a differential pressure between an ejection pressure of the oil ejected from the hydraulic pump and a load pressure of oil supplied to the hydraulic actuators; and control pressure generating means including an electromagnetic proportional valve for generating a control pressure for changing the target differential pressure, wherein in driving each hydraulic actuator, a flow rate of the oil ejected from the hydraulic pump is controlled in such a manner as to satisfy a required flow rate of the hydraulic actuator, a control output is performed to correct a ratio of a supply flow rate with respect to the required flow rate of the hydraulic actuator according to a change in an engine rotation number, and the control pressure is generated by the electromagnetic proportional valve to change the target differential pressure.

The control device sets a value of the control output as a basic control output value, and generates the control pressure by controlling the electromagnetic proportional valve based on a pump ejection amount control output value obtained by adding a correction amount to the basic control output value. In a case where a change in a specific environment state quantity is a factor causing a decrease in an engine output, the environment state quantity is set as an engine output environment state quantity, a state where the engine output environment state quantity is a reference value is set as a reference environment condition, and the correction amount is a numerical value obtained by multiplying a basic correction amount determined under the reference environment condition by a correction rate determined based on a measured value of the engine output environment state quantity.

The control device includes: a control output value map for use in determining the basic control output value according to a target engine rotation number; a correction amount map for use in determining the basic correction amount according to the target engine rotation number under the reference environment condition; and a correction rate map for determining the correction rate based on the measured value of the engine output environment state quantity. The control device determines the basic control output value and the basic correction amount by applying a set target engine rotation number to the control output value map and the correction amount map, and also determines the correction rate by applying the measured value of the engine output environment state quantity to the correction rate map.

In a first embodiment of the above control device, the engine output environment state quantity is the atmospheric pressure.

In a second embodiment of the above control device, the engine output environment state quantity is an engine intake air temperature.

The control device controls the flow rate of the oil ejected from the hydraulic pump, based on detection of a decrease in an actual engine rotation number.

The control device generates the control pressure based on a value obtained by adding, to the pump ejection amount control output value, a speed-sensitive control output value set for controlling the flow rate of the oil ejected from the hydraulic pump based on the detection of the decrease in the actual engine rotation number.

Advantageous Effects of Invention

With the above-described control device of a hydraulic machine, when a measured value of the engine output environment state quantity is within a range that causes a decrease in engine output, a correction amount determined based on the measured value of the engine output environment state quantity is added to the basic control output value, and a control pressure is generated based on a pump ejection amount control output value which is a value surpassing the basic control output value. Therefore, the flow rate of oil ejected from the pump corresponds to the state after the decrease in the engine output, and there is no need for changing the rotation number in a low idling state. Hence, the risk of engine stall and the like can be avoided without generating noise.

The correction amount is a value on which a current to be applied is based, as is the case with the basic control output value. Regarding determination of this value, it only requires that a device serving as detecting means for measuring the engine output environment state quantity be provided as needed, in addition to the correction amount map and the correction rate map configured in consideration of the state where the engine output environment state quantity is the reference value. This is more economical, because the above pump control effect can be achieved without a need of adding a particular expensive device. Further cost cutting can be achieved, if a member already provided to the hydraulic machine can be used as means for detecting the engine output environment state quantity.

Further, at a time of performing a work with the hydraulic machine at a high-altitude environment where the atmospheric pressure is low, the configuration of the first embodiment determines the correction rate and the correction amount, based on the measured value of the atmospheric pressure which is the engine output environment state quantity, and reduces the flow rate of oil ejected from the pump, according to the state where the engine output is lowered due to the decrease in the atmospheric pressure. Thus, the work can be stably performed while avoiding the above-described problem which is likely to occur in the work at a high-altitude environment.

Further, at a time of performing a work with the hydraulic machine at a high temperature environment, the configuration of the second embodiment determines the correction rate and the correction amount, based on the measured value of the engine intake air temperature which is the engine output environment state quantity. The flow rate of ejection from the pump is controlled to be reduced based on the correction rate and the correction amount. Thus, the amount of ejection from the pump is reduced according to the state where the engine output is lowered, during the work in the high temperature environment. Therefore, the driving speed of the hydraulic actuator is suppressed, and a problem such as an excessive decrease in the engine rotation number can be avoided.

Further, by adding a structure to control the flow rate of the oil ejected from the hydraulic pump based on a detected decrease in the actual engine rotation number as described above, an unexpected decrease in the engine rotation number that cannot be coped with by the pump control based on the pump ejection amount control output value and the correction amount determined can be addressed. Since the electromagnetic proportional valve is also used in this control in response to the decrease in the engine speed, an increase in the costs can be suppressed or reduced.

DESCRIPTION OF EMBODIMENTS

Figure 1:
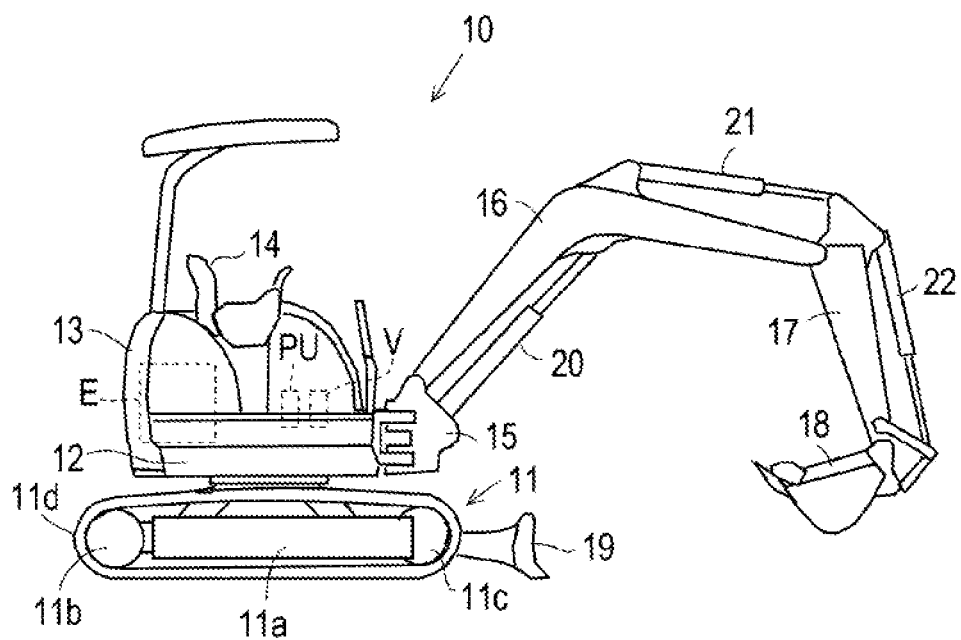
FIG. 1 A side view of an excavator work machine as an example of a hydraulic machine.

An overview configuration of a revolving excavator work machine 10 as an embodiment of a hydraulic machine shown in FIG. 1 will now be described. The revolving excavator work machine 10 includes a pair of left and right crawler type traveling devices 11. Each of the crawler type traveling devices 11 includes a truck frame 11*a* on which a driving sprocket 11*b* and a driven sprocket 11*c* are supported, with a crawler 11*d* wound on the driving sprocket 11*b* and the driven sprocket 11*c* so as to stretch therebetween. It may be conceivable that the traveling devices are wheel type traveling devices.

A revolving base 12 is mounted on the pair of left and right crawler type traveling devices 11 such that the revolving base 12 is rotatable about a vertical pivot relative to the both of the crawler type traveling devices 11. Mounted on the revolving base 12 is a hood 13 in which an engine E, a pump unit PU, a control valve unit V, and the like, are installed. Moreover, an operator's seat 14 is disposed on the revolving base 12. Manual operation tools such as levers and pedals for operating each hydraulic actuator (described later) are disposed on the front and lateral sides of the seat 14.

The revolving base 12 is provided with a boom bracket 15 that is rotatable in the horizontal direction relative to the revolving base 12. The boom bracket 15 pivotally supports a proximal end portion of a boom 16 such that the boom 16 can be rotated up and down. A distal end portion of the boom 16 pivotally supports a proximal end portion of the arm 17 such that the arm 17 can be rotated up and down. A distal end portion of the arm 17 pivotally supports a bucket 18 serving as a work machine such that the bucket 18 can be rotated up and down. As another work machine, an earth removing blade 19 is attached to the pair of left and right crawler type traveling devices 11 such that the earth removing blade 19 can be rotated up and down.

Figure 2:
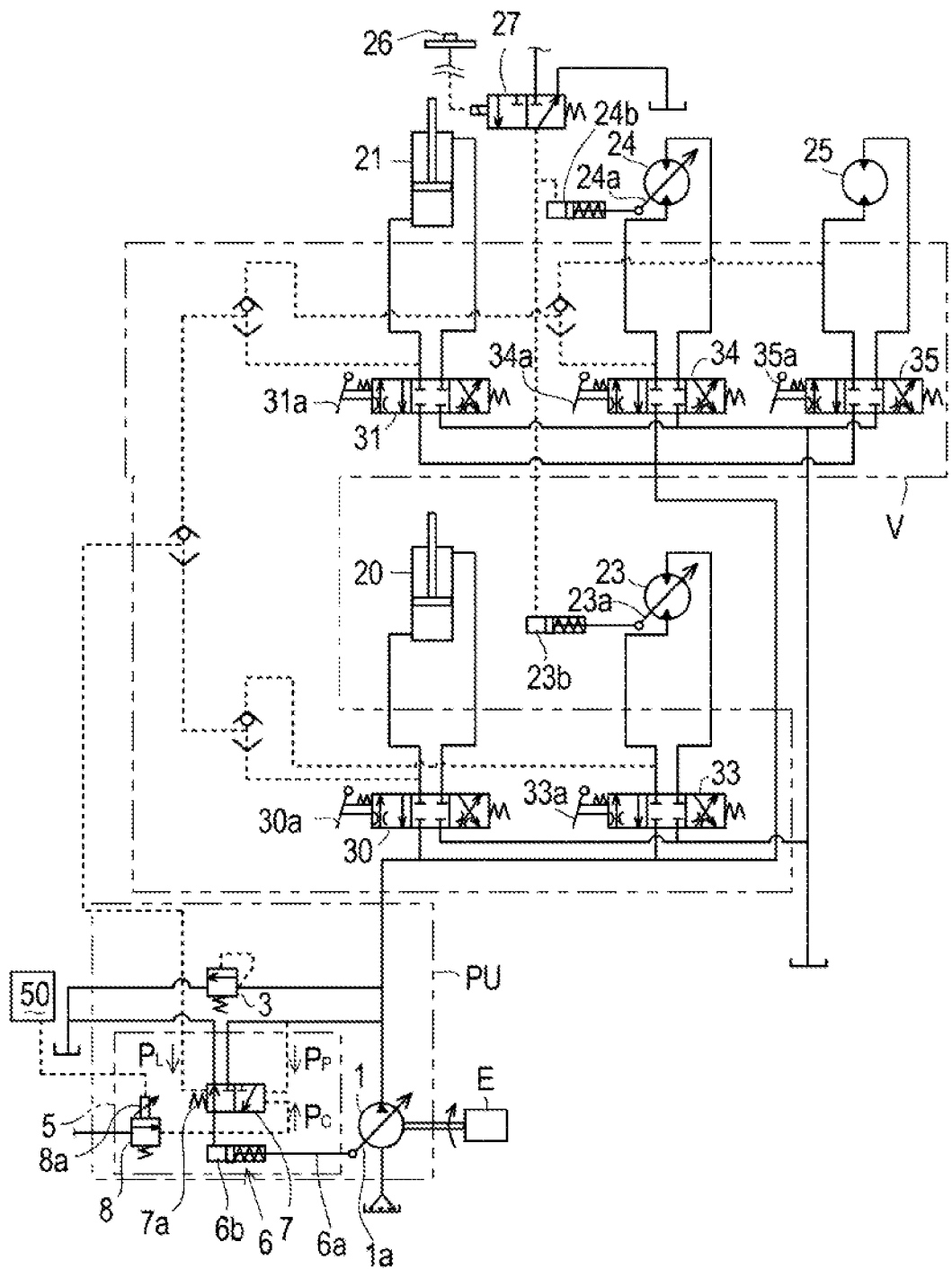
FIG. 2 A hydraulic circuit diagram showing a system for supplying pressure oil to a hydraulic actuator.

To drive the respective drive units of the revolving excavator work machine 10 mentioned above, the revolving excavator work machine 10 includes a plurality of hydraulic actuators as shown in FIG. 2. FIG. 1 shows typical hydraulic actuators, namely, a boom cylinder 20, an arm cylinder 21, and a bucket cylinder 22. Expansion and contraction of a piston rod of the boom cylinder 20 rotates the boom 16 up and down relative to the boom bracket 15. Expansion and contraction of a piston rod of the arm cylinder 21 rotates the arm 17 up and down relative to the boom 16. Expansion and contraction of a piston rod of the bucket cylinder 22 rotates the bucket 18 up and down relative to the arm 17.

In addition, the revolving excavator work machine 10 also includes expansion/contraction type hydraulic actuators constituted by hydraulic cylinders, such as a swing cylinder for horizontally turning the boom bracket 15 relative to the revolving base 12 and a blade cylinder for rotating the blade 19 up and down relative to the left and right crawler type traveling devices 11, though not shown in FIG. 1.

In addition, the revolving excavator work machine 10 also includes rotary type hydraulic actuators constituted by hydraulic motors, such as a first traveling motor 23 (see FIG. 2) for driving the driving sprocket 11*b* of one of the left and right crawler type traveling devices 11, a second traveling motor 24 (see FIG. 2) for driving the driving sprocket 11*b* of the other of the left and right crawler type traveling devices 11, and a revolving motor 25 (see FIG. 2) for revolving the revolving base 12 relative to the left and right crawler type traveling devices 11, though not shown in FIG. 1.

Referring to a hydraulic circuit diagram shown in FIG. 2, a description will be given to a supply control system for controlling a supply of oil ejected from a hydraulic pump to the respective hydraulic actuators included in the revolving excavator work machine 10. The revolving excavator work machine 10 includes a hydraulic pump 1 which is driven by the engine E. The hydraulic pump 1 supplies pressure oil to the boom cylinder 20, the arm cylinder 21, traveling motors 23, 24, and the revolving motor 25. In the hydraulic circuit diagram of FIG. 2, these are illustrated as typical hydraulic actuators, and illustration of other hydraulic actuators is omitted.

The hydraulic actuators individually include direction control valves, respectively. A collection of these direction control valves constitutes the control valve unit V.

Each of the direction control valves has its position switched by a manual operation on each of the manual operation tools mentioned above, to switch an oil supply direction. Each of the direction control valves has a meter-in throttle. The meter-in throttle has its opening degree variable in accordance with an operation amount on each manual operation tool. This, in combination with a control on an ejection flow rate from the hydraulic pump 1 performed by a load-sensing type pump control system 5 (described later), can cause a flow rate of the hydraulic oil supply to each hydraulic actuator to match a required flow rate of each hydraulic actuator, thus reducing an excess flow rate which is a loss because it is returned to a tank without working. In this manner, an increased operation efficiency of the hydraulic oil supply system for supplying hydraulic oil to the hydraulic actuator is attempted. In other words, a required flow rate of each hydraulic actuator is fixed by the opening degree of the meter-in throttle which is set according to an operation amount on the direction control valve of the hydraulic actuator.

In FIG. 2, the manual operation tools of the direction control valves 30, 31, 33, 34, 35 are illustrated as a boom operation lever 30a, an arm operation lever 31a, a first travel operation lever 33a, a second travel operation lever 34a, and a revolving operation lever 35a. Alternatively, however, the manual operation tools may be pedals or switches instead of levers, and may be integrated as appropriate. For example, it may be acceptable that one direction control valve is controlled by turning one lever in one direction, and another direction control valve is controlled by turning the one lever in another direction.

It may be also acceptable that the manual operation tools (levers 30a, 31a, 33a, 34a, 35a) are remote control (pilot) valves, so that the direction control valves 30, 31, 33, 34, 35 are controlled by pilot pressures caused by operations on the manual operation tools.

The revolving excavator work machine 10 also includes a speed change switch 26. The speed change switch 26 is linked to a movable swash plate 23a and a movable swash plate 24a of the first traveling motor 23 and the second traveling motor 24 which are variable displacement type hydraulic motors. As the speed change switch 26 is operated, the movable swash plates 23a, 24a are concurrently tilted. Here, the movable swash plates 23a, 24a of the traveling motors 23, 24 may alternatively be operated with a manual operation tool other than a switch, for example, with a pedal or a lever.

In this embodiment, the speed change switch 26 serves as an on/off switch. On-operation of the speed change switch 26 places the movable swash plates 23a, 24a into a small-inclination-angle (small-capacity) position for high-speed (normal-speed) setting, which is suitable for traveling on a road. Off-operation of the speed change switch 26 places the movable swash plates 23a, 24a into a large-inclination-angle (large-capacity) position for low-speed (work-speed) setting, which is suitable for traveling with work.

In more detail, the movable swash plates 23a, 24a are respectively linked to piston rods of swash plate control cylinders 23b, 24b which are hydraulic actuators. An open/close valve 27 is provided for supplying hydraulic oil to the swash plate control cylinders 23b, 24b. When the speed change switch 26 is turned on, the open/close valve 27 is opened by a pilot pressure, to supply hydraulic oil to the swash plate control cylinders 23b, 24b, so that the swash plate control cylinders 23b, 24b push and move the movable swash plates 23a, 24a into the small-inclination-angle position. When the speed change switch 26 is turned off, the open/close valve 27 brings back the hydraulic oil from the swash plate control cylinders 23b, 24b, so that the movable swash plates 23a, 24a are returned to the large-inclination-angle position due biasing with springs of the piston rods.

The hydraulic pump 1, a relief valve 3, and the load-sensing type pump control system 5 are combined to constitute the pump unit PU. The relief valve 3 prevents an excessive ejection pressure of the hydraulic pump 1. The load-sensing type pump control system 5 is constituted by a combination of a pump actuator 6, a load-sensing valve 7, and a pump control proportional valve 8.

The pump actuator 6 is constituted by a hydraulic cylinder, and its piston rod 6a is linked to a movable swash plate 1a of a first hydraulic pump 1. Expansion and contraction of the piston rod 6a cause the movable swash plate 1a to be tilted, thereby changing an inclination angle of the movable swash plate 1a. In this manner, an ejection flow rate $Q_P$ from the hydraulic pump 1 is changed.

The load-sensing valve 7 has a supply/discharge port that is in communication with a pressure oil chamber 6b of the pump actuator 6. The pressure oil chamber 6b is for expansion of the piston rod. The load-sensing valve 7 is biased by a spring 7a, in a direction of letting oil out of the pressure oil chamber 6b of the pump actuator 6, that is, in a direction of contracting the piston rod 6a. The direction in which the piston rod 6a contracts is toward the side where the inclination angle of the movable swash plate 1a increases, that is, the side where the ejection flow rate from the hydraulic pump 1 increases.

Oil ejected from the hydraulic pump 1 is partially received by the load-sensing valve 7, to serve as hydraulic oil to be supplied to the pressure oil chamber 6b of the pump actuator 6. Part of this oil is, against the spring 7a, applied to the load-sensing valve 7, to serve as a pilot pressure that is based on an ejection pressure $P_P$ of the hydraulic pump 1. The ejection pressure $P_P$ serving as the pilot pressure applied to the load-sensing valve 7 is exerted so as to switch the load-sensing valve 7 in a direction of supplying oil to the pressure oil chamber 6b of the pump actuator 6, that is, in a direction of expanding the piston rod 6a.

From all hydraulic pressures at secondary sides after the meter-in throttles of all the direction control valves, that is, from all hydraulic pressures of supply oils from the direction control valves to the hydraulic actuators, a maximum hydraulic pressure which means a maximum load pressure $P_L$ is extracted, and is applied to the load-sensing valve 7 to serve as a pilot pressure against the ejection pressure $P_P$.

Here, a flow rate of oil passing through the meter-in throttle of each direction control valve and supplied to the corresponding hydraulic actuator, that is, a required flow rate $Q_R$ of each hydraulic actuator is calculated by mathematical expressions indicated as "Math. 1" below.

$$Q_R = cA\sqrt{\frac{2\Delta P}{\rho}}$$ [Math. 1]

$$\Delta P_0 = P_P - P_L$$

$$\Delta P = \Delta P_0 - P_C$$

$Q_R$=required flow rate
c=coefficient
A=metering throttle opening degree (cross-sectional area)
$\Delta P$=differential pressure
$\rho$=density
$\Delta P_0$=uncontrolled differential pressure (specified differential pressure)
$P_P$=ejection pressure
$P_L$=(maximum) load pressure
$P_C$=control pressure Assuming that the control pressure $P_C$ (described later) is zero, the position of the load-sensing valve 7 is switched depending on whether the differential pressure $\Delta P$ (uncontrolled differential pressure $\Delta P_0$; hereinafter, specified differential pressure $\Delta P_0$) between the ejection pressure $P_P$ and the maximum load pressure $P_L$ is higher or lower than a spring force $F_S$ of the spring 7a. When the differential pressure $\Delta P$ is higher than the spring force $F_S$, the piston rod 6a of the pump actuator 6 expands so that the inclination angle of the movable swash plate 1a decreases to reduce the ejection flow rate $Q_P$ of the hydraulic pump 1. When the spring force $F_S$ is higher than the differential pressure $\Delta P$, the piston rod 6a of the pump actuator 6 contracts so that the inclination angle of the movable swash plate 1a increases to increase the ejection flow rate $Q_P$ of the hydraulic pump 1.

The expressions above indicate that the required flow rate $Q_R$ is proportional to the cross-sectional area A (opening degree) of the meter-in throttle, if the differential pressure $\Delta P$ is constant. The opening degree A of the meter-in throttle is determined according to an operation amount on the manual operation tool of the direction control valve in which this meter-in throttle is provided. In other words, the required flow rate $Q_R$ is a value that is determined irrespective of a change in the engine rotation number. The required flow rate $Q_R$ is kept constant, as long as the operation amount is kept constant.

If, due to an insufficient ejection flow rate $Q_P$ from the hydraulic pump 1, a supply flow rate to an operation-object hydraulic actuator through the meter-in throttle of the direction control valve is less than the required flow rate $Q_R$ of the hydraulic actuator; the differential pressure $\Delta P$ decreases and falls below the spring force $F_S$ so that the load-sensing valve 7 is operated in the direction of increasing the inclination angle of the movable swash plate 1a, which increases the ejection flow rate $Q_P$ from the hydraulic pump 1, thus increasing the supply flow rate to this hydraulic actuator. In this manner, a driving speed of this hydraulic actuator can be increased to a speed set by the manual operation tool of this hydraulic actuator.

If the ejection flow rate $Q_P$ from the hydraulic pump 1 is too high, the differential pressure $\Delta P$ increases and exceeds the spring force $F_S$ so that the load-sensing valve 7 is operated in the direction of reducing the inclination angle of the movable swash plate 1a, which reduces the ejection flow rate $Q_P$ from the hydraulic pump 1, thus reducing the supply flow rate to the hydraulic actuator to a value corresponding to the required flow rate $Q_R$ of this hydraulic actuator. In this manner, an excessive supply amount of hydraulic oil can be reduced.

Even when, for example, an operation amount on each lever (a spool stroke of each direction control valve) is at its maximum (that is, the opening degree of the meter-in throttle of each direction control valve is at its maximum), the required flow rate $Q_R$ varies depending on an operation-object hydraulic actuator. For example, a required flow rate of the boom cylinder 20 for turning the boom 16 is high. On the other hand, a required flow rate of the revolving motor 25 for turning the revolving base 12 is not so high.

Although the required flow rates of the individual actuators are different from one another, controlling the inclination angle of the movable swash plate 1a in such a manner that the differential pressure $\Delta P$ in the load-sensing valve 7 can be equal to a differential pressure (target differential pressure) specified by the spring force $F_S$ of the spring 7a as mentioned above allows the hydraulic pump 1 to supply oil with a flow rate corresponding to a required flow rate specified by the direction control valve of each actuator.

That is, for all the actuators, the inclination angle (pump capacity) of the movable swash plate 1a of the hydraulic pump 1 is controlled with targeting a ratio $(Q/Q_R)$ (hereinafter referred to as "supply/required flow rate ratio") of the supply flow rate $Q$ to the required flow rate $Q_R$ being 1 (hereinafter, this target value will be referred to as "target supply/required flow rate ratio Rq").

If the inclination angle of the movable swash plate 1a is set constant, the ejection flow rate $Q_P$ from the hydraulic pump 1 is changed with a change in an engine rotation number N.

Supply flow rate characteristics in a case of alternating turning of the boom 16 with the boom operation lever 30a operated to its maximum operation amount and turning of the revolving base 12 with the revolving operation lever 35a operated to its maximum operation amount will now be discussed with reference to FIG. 3, on the assumption that the target differential pressure $\Delta P$ in the load-sensing valve 7 is equal to the specified differential pressure $\Delta P_0$ specified by the spring force $F_S$ irrespective of a change in the engine rotation number (that is, over the entire region of the engine rotation number, for driving of all the actuators, the movable swash plate 1a of the pump 1 is controlled with targeting the target supply/required flow rate ratio Rq being 1 (Rq=1)).

Figure 3:
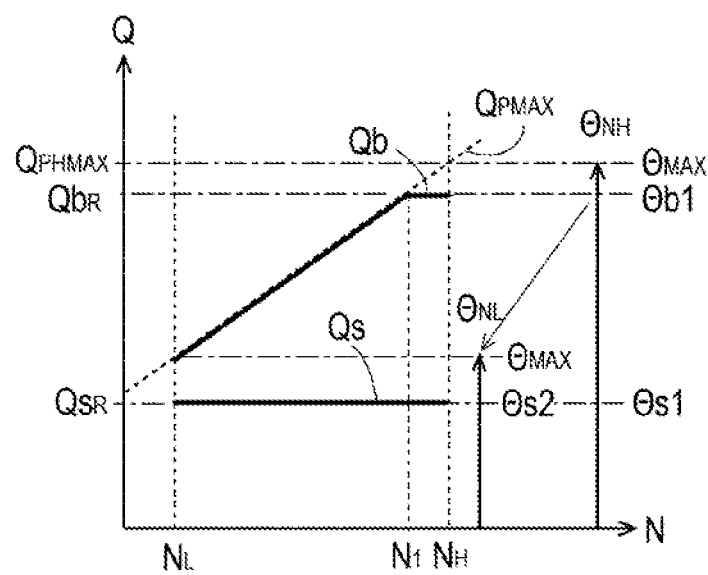
FIG. 3 A graph of a supply flow rate to the hydraulic actuator relative to an engine rotation number under a load-sensing type pump control with no control pressure applied.

FIG. 3 shows characteristics of the supply flow rate Q to the hydraulic actuator over the entire region of the engine rotation number N which is set for operations of the hydraulic actuators (shown herein are characteristics of a supply flow rate Qb to the boom cylinder 20 and a supply flow rate Qs to a revolving motor 25). A minimum value and a maximum value of the region of the engine rotation number N are a low idling rotation number $N_L$ and a high idling rotation number $N_H$, respectively. The inclination angle of the movable swash plate 1a is indicated by $\Theta_{NH}$ and $\Theta_{NL}$. $\Theta_{NH}$ represents the inclination angle at a time of driving the engine with the high idling rotation number $N_H$ (hereinafter referred to as "at a time of high idling rotation"). $\Theta_{NL}$ represents the inclination angle at a time of driving the engine with the low idling rotation number $N_L$ (hereinafter referred to as "at a time of low idling rotation").

FIG. 3 shows a change in a maximum rate $Q_{P\ MAX}$ of the pump ejection flow rate $Q_P$ (hereinafter, maximum ejection flow rate $Q_{P\ MAX}$) over the engine rotation-number region, in a case where the movable swash plate 1a is at its maximum inclination angle position. The supply flow rate Q is a flow rate that is actually supplied to each actuator via the direction control valve. As long as each actuator is driven solely; for each driving, the load-sensing type pump control system 5 controls the ejection flow rate $Q_P$ from the hydraulic pump 1 such that the ejection flow rate $Q_P$ can correspond to the required flow rate $Q_R$. As a result, therefore, the ejection flow rate $Q_P$=the supply flow rate Q can be established. This is an assumption on which the following description depends.

As long as the target differential pressure $\Delta P$ is set to the specified differential pressure $\Delta P_0$; each time each actuator is operated, the inclination angle of the movable swash plate 1a is controlled such that oil ejected from the pump 1 can be supplied so as to satisfy the required flow rate $Q_R$ of the actuator, that is, such that the target supply/required flow rate ratio Rq can be 1.

A required flow rate $Qb_R$ of the boom cylinder 20 with the boom operation lever 30a operated to its maximum operation amount is determined by a maximum opening area $S_{MAX}$ (see FIG. 6) of the meter-in throttle of the direction control valve 30. The required flow rate $Qb_R$ is lower than a pump maximum ejection flow rate $Q_{PH\ MAX}$ at a time of high idling rotation. Thus, an inclination angle $\Theta b1$ of the movable swash plate $1a$ in a case of driving the boom 16 at a time of high idling rotation is equal to or smaller than a maximum inclination angle $\theta_{MAX}$ (in this embodiment, smaller than the maximum inclination angle $\Theta_{MAX}$). That is, at a time of high idling rotation, the supply flow rate Qb to the boom cylinder 20 equals the required flow rate $Qb_R$. Thus, at a time of high idling rotation, the supply flow rate Qb to the boom cylinder 20 has a maximum value, and a driving speed of the boom 16 exerted at this time is a maximum driving speed.

The required flow rate $Qb_R$ of the boom cylinder 20 is constant while the required flow rate $Qb_R$ of the boom cylinder 20 is relatively higher among all the actuators. Therefore, as long as the operation amount on the boom operation lever $30a$ is kept at the maximum value, the maximum ejection flow rate $Q_{P\ MAX}$ decreases as the engine rotation number N decreases from the high idling rotation number $N_H$, and eventually (at a time point when the engine rotation number N reaches $N_1$ in FIG. 3), the maximum ejection flow rate $Q_{P\ MAX}$ itself becomes equal to the required flow rate $Qb_R$ of the boom cylinder 20. While the engine rotation number N is decreasing from $N_H$ to $N_1$, the load-sensing type pump control system 5 increases the inclination angle of the movable swash plate $1a$ in order to attain the target supply/required flow rate ratio Rq (=1) of the boom cylinder 20. At a time point when the engine rotation number N=$N_1$, the inclination angle of the movable swash plate $1a$ reaches the maximum inclination angle $\Theta_{MAX}$.

While the engine rotation number N having fallen below $N_1$ is decreasing to the low idling rotation number $N_L$, the maximum ejection flow rate $Q_{P\ MAX}$ falls below the required flow rate $Qb_R$ of the boom cylinder 20. Consequently, as the engine rotation number decreases, the supply flow rate Qb to the boom cylinder 20 overlaps the maximum ejection flow rate $Q_{P\ MAX}$ and decreases together with the maximum ejection flow rate $Q_{P\ MAX}$. With the decrease in the supply flow rate Qb, the operating speed of the boom cylinder 20, i.e., the driving speed of the boom 16 is reduced.

A required flow rate $Qs_R$ of the revolving motor 25 with the revolving operation lever $35a$ operated to its maximum operation amount is determined by a maximum opening area $S_{MAX}$ (see FIG. 6) of the meter-in throttle of the direction control valve 35. To satisfy the required flow rate $Qs_R$, at a time of high idling rotation, the movable swash plate $1a$ of the hydraulic pump 1 is placed with an inclination angle $\theta s1$, so that the revolving motor 25 is operated at its maximum speed, that is, the revolving base 12 is revolved at its maximum speed. At a time of high idling rotation, therefore, alternating the driving of the boom cylinder 20 with the boom operation lever $30a$ operated to its maximum operation amount and the driving of the revolving motor 25 with the revolving operation lever $35a$ operated to its maximum operation amount allows both the boom 16 and the revolving base 12 to be turned at their respective maximum driving speeds.

The required flow rate $Qs_R$ of the revolving motor 25 with the revolving operation lever $35a$ operated to its maximum operation amount is considerably lower than the required flow rate $Qb_R$ of the boom cylinder 20 with the boom operation lever $30a$ operated to its maximum operation amount. At a time of high idling rotation, the inclination angle $\Theta H$ of the movable swash plate $1a$ is considerably smaller than the inclination angle $\Theta b1$ in a case of operating the boom cylinder 20 with the boom operation lever $30a$ operated to its maximum operation amount. Thus, there is a considerable tilt allowable range before reaching the maximum inclination angle $\Theta_{MAX}$.

While the engine rotation number N is decreasing from the high idling rotation number $N_H$ with the amount of operation on the revolving operation lever $35a$ being kept at the maximum operation amount, the movable swash plate $1a$ is tilted in the direction of increasing the inclination angle $\theta$ such that the supply flow rate Qs can satisfy the required flow rate $Qs_R$, under a pump control that the load-sensing type pump control system 5 performs with targeting the target supply/required flow rate ratio Rq being 1. Since the tilt allowable range is wide, the maximum inclination angle $\Theta_{MAX}$ is not reached even though the engine rotation number N decreases to the low idling rotation number $N_L$ so that the movable swash plate $1a$ is tilted in the angle increasing direction to the maximum and eventually reaches an inclination angle $\Theta s2$. Accordingly, while the engine rotation number N is decreasing to the low idling rotation number $N_L$, the supply flow rate Qs to the revolving motor 25 satisfies the required flow rate $Qs_R$, and the operating speed of the revolving motor 25 is kept at the maximum speed so that the revolving speed of the revolving base 12 is also kept at the maximum speed.

As described above, the driving speed of the boom 16 at a time of low idling rotation is lower than that at a time of high idling rotation, whereas the driving speed of the revolving base 12 at a time of low idling rotation is kept equal to that at a time of high idling rotation. In this situation, if an operator turns the boom 16 at a slow speed on the assumption that the engine E is driven with the low idling rotation number $N_L$ and then shifts to an operation of turning the revolving base 12, the turning speed is higher than the operator has expected, which makes the operator feel uncomfortable in performing the operation. Moreover, even though the operator desires to move the revolving base 12 at a minute speed, the revolving speed of the revolving base 12 is not changed by reduction in the engine rotation number. The speed can be adjusted only by adjustment of the revolving operation lever $35a$. Thus, a delicate revolving operation of the machine is difficult.

If the target supply/required flow rate ratios Rq for all the actuators are reduced at a constant ratio so as to correspond to a decrement of the engine rotation number, and the load-sensing type pump control system 5 performs the pump control; the supply flow rates Q to the respective actuators at a time of operating the actuators are uniformly reduced so as to correspond to the decrement of the engine rotation number N, irrespective of high/low of their required flow rates $Q_R$. Accordingly, the driving speeds of the respective drive units driven by the respective actuators can be reduced uniformly.

For example, in a case of alternating turning of the boom 16 and turning of the revolving base 12 as described above; at a time of low idling rotation, the turning of the revolving base 12 can be made slow down with a sensation equivalent to slow-down of the turning of the boom 16 as compared to at a time of high idling rotation. Thus, an inconvenience that the operator feels as if the turning of the revolving base 12 is relatively high as compared to the turning of the boom 16 can be removed.

Under such a pump control, the driving speed of the revolving motor 25 decreases as the engine rotation number decreases, and therefore it is possible to delicately adjust the position of the revolving base 12 by minutely adjusting the speed of the revolving motor 25 based on increase and decrease in the engine rotation number, which would be impossible if the pump control is performed with the target supply/required flow rate ratio Rq=1 being fixed.

To reduce the target supply/required flow rate ratios Rq for all the actuators in accordance with a decrease in the engine rotation number, the load-sensing type pump control system 5 is provided with an electromagnetic proportional valve serving as the pump control proportional valve 8. Oil from the pump control proportional valve 8 is, as pilot pressure oil, supplied to the load-sensing valve 7. A secondary pressure of the load-sensing valve 7 having this oil is the control pressure $P_C$ which is applied to the load-sensing valve 7 against the maximum load pressure $P_L$.

A differential pressure between the ejection pressure $P_P$ and the maximum load pressure $P_L$ required to balance the spring force $F_S$, which means the target differential pressure $\Delta P$, is reduced by an amount corresponding to addition of the control pressure $P_C$. Accordingly, as the control pressure $P_C$ increases, the load-sensing valve 7 operates in the direction of reducing the inclination angle of the movable swash plate 1a, so that the ejection flow rate from the hydraulic pump 1 decreases.

The control pressure $P_C$ is determined by a current value that is applied to a solenoid 8a of the pump control proportional valve 8 which is an electromagnetic proportional valve. This value is defined as a basic control output value C1. For the direction control valve of each hydraulic actuator, a correlation of the required flow rate of each hydraulic actuator with the operation amount on the manual operation tool of this hydraulic actuator is estimated with respect to each engine rotation number. A correlation map of the basic control output value C1 corresponding to the engine rotation number is prepared so as to achieve the estimated correlation. This map is stored in a storage unit of the controller that controls the control output value to be applied to the pump control proportional valve 8. This is how to enable the supply/required flow rate ratios of all the hydraulic actuators to be controlled so as to correspond to a change in the engine rotation number (that is, how to enable a control under which the driving speeds of the plurality of actuators decrease at the same ratio in accordance with the engine rotation number), as described above. Based on this map, the target values of the supply/required flow rate ratios for all the hydraulic actuators, which intrinsically should be 1, are reduced in accordance with a decrease in the engine rotation number. This control will hereinafter be referred to as "speed reducing control" in the following description.

Figure 7:
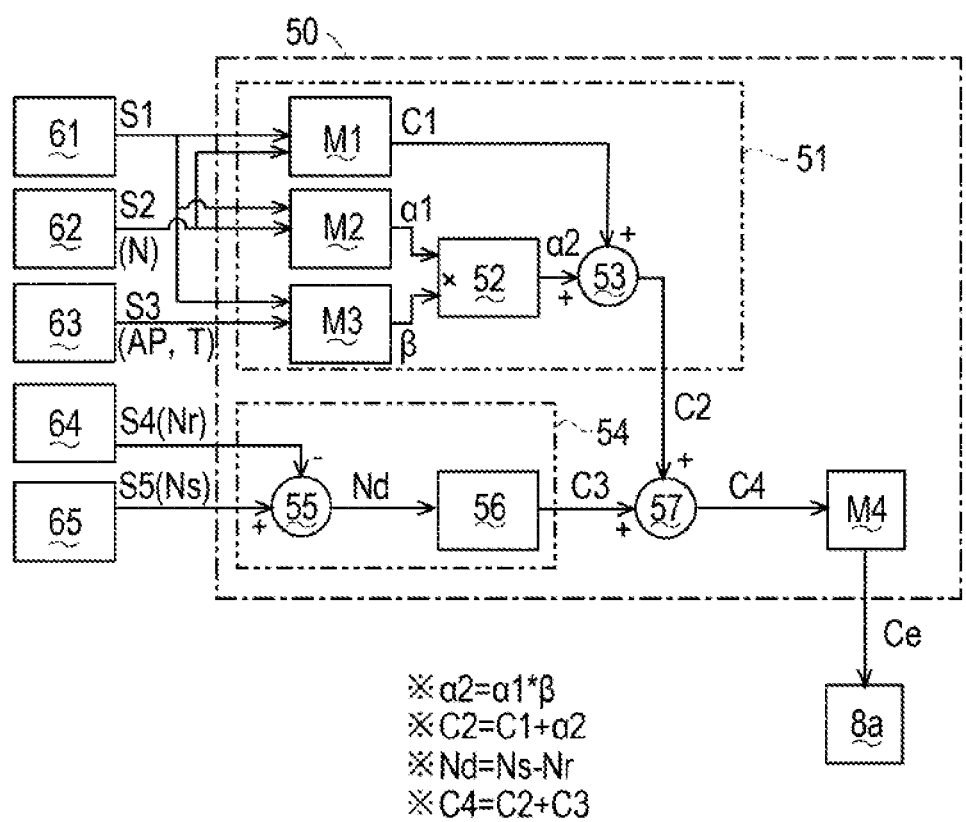
FIG. 7 A block diagram of a load-sensing type pump control system, showing a system for generating a command current to be applied to a pump control proportional valve.

In the revolving excavator work machine 10, a control system for the hydraulic actuators as shown in FIG. 7 is structured. A controller 50 includes a load-sensing control unit 51 that stores therein a basic control output value map M1 of the basic control output value C1 in correlation with the engine rotation number N, for every actuator.

The basic control output value map M1 stored in the load-sensing control unit 51 is prepared for each work mode, some of which mode can be set in the revolving excavator work machine 10. The map M1 corresponding to a set work mode is selected. When a target engine rotation number N is set, the basic control output value C1 is determined based on application of the value to the selected map M1.

Figure 4A:
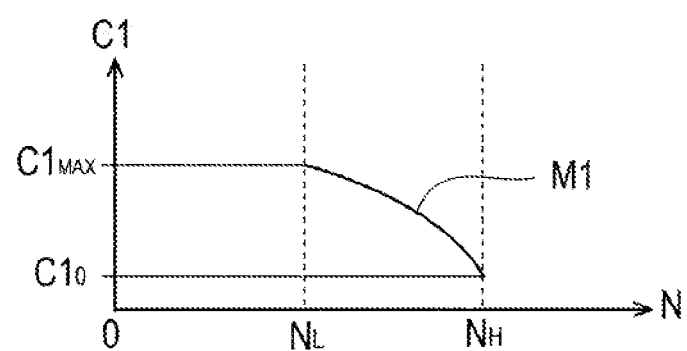
FIG. 4 Maps and graphs concerning the load-sensing type pump control, in which FIG. 4(*a*) is a map of a control output value, FIG. 4(*b*) is a graph of the control pressure, and FIG. 4(*c*) is a graph of a target differential pressure.
Figure 4B:
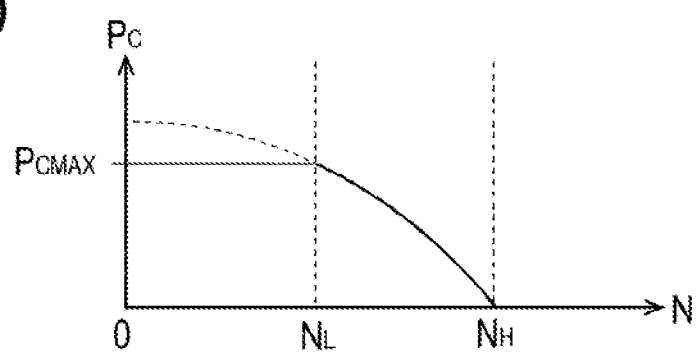
Figure 4C:
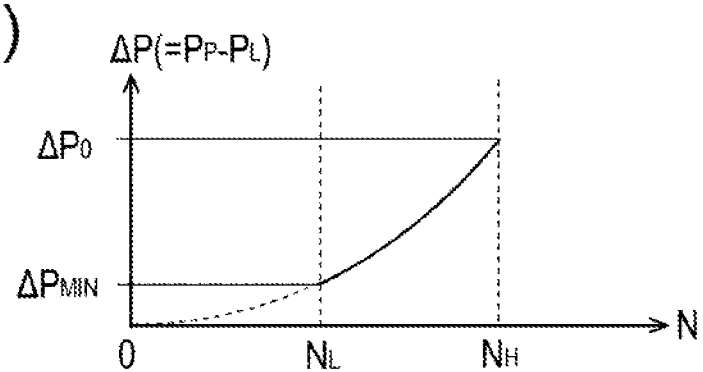
Figure 5:
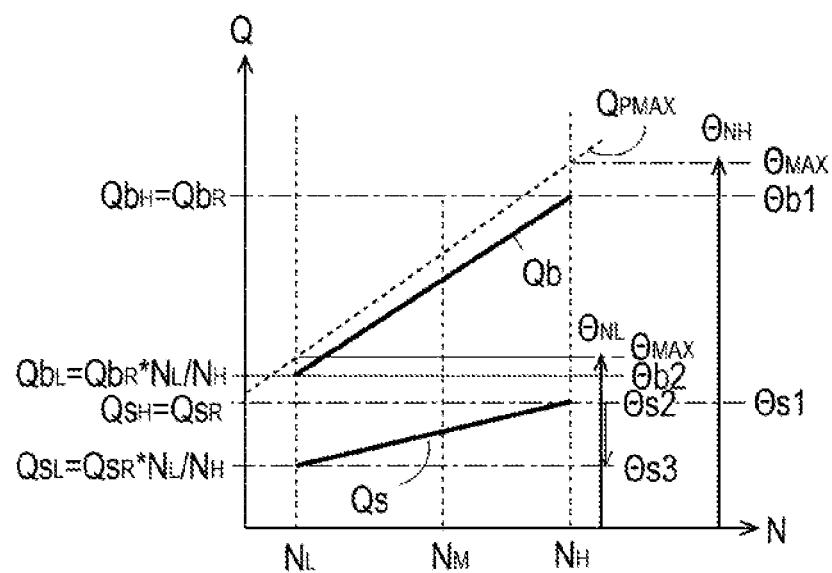
FIG. 5 A graph of the supply flow rate to the hydraulic actuator relative to the engine rotation number under the load-sensing type pump control with a control pressure applied.
Figure 6:
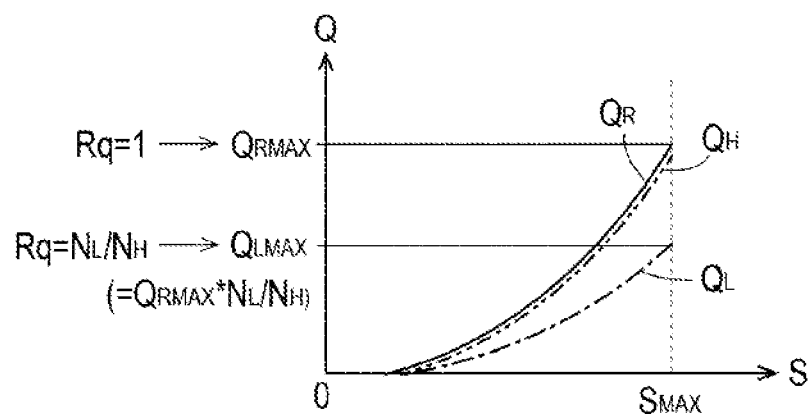
FIG. 6 A graph of the supply flow rate to the hydraulic actuator relative to an operation amount under the load-sensing type pump control.

Referring to FIG. 4 to FIG. 6, a description will be given to a map of the basic control output value C1, and a manner of the pump control based on the map, in relation to the "speed reducing control".

FIG. 4(a) shows the basic control output value map M1 indicating a change in the basic control output value C1 along with a decrease of the engine rotation number N from the high idling rotation number $N_H$ to the low idling rotation number $N_L$. Here, a configuration of the basic control output value map M1, which is typical one in the group of maps prepared for each of several modes that can be set in the revolving excavator work machine 10 as mentioned above, will be described.

In the basic control output value map M1, the basic control output value C1 at a time of high idling rotation serves as a minimum value $C1_0$ (which means a value that causes the secondary pressure (control pressure $P_C$) of the pump control proportional valve 8 to be zero), the basic control output value C1 at a time of low idling rotation serves as a maximum value $C1_{MAX}$, and the basic control output value C1 increases as the engine rotation number N decreases from the high idling rotation number $N_H$ to the low idling rotation number $N_L$.

FIG. 4(b) and FIG. 4(c) show changes in pressures applied to the load-sensing valve 7 in a case of changing the basic control output value C1 for the pump control proportional valve 8 (the current value applied to the solenoid 8a) in accordance with a change in the engine rotation number N based on the basic control output value map M1. FIG. 4(b) shows a change in the secondary pressure of the pump control proportional valve 8, that is, a change in the control pressure $P_C$. FIG. 4(c) shows a change in the target value for the differential pressure $\Delta P$ between the ejection pressure $P_P$ and the maximum load pressure $P_L$, that is, a change in the target differential pressure $\Delta P$.

At a time of high idling rotation, the basic control output value C1 is the minimum value $C1_0$, and therefore the control pressure $P_C$ is zero. Accordingly, the target differential pressure $\Delta P$ is the specified differential pressure $\Delta P_0$ which is equal to the spring force $F_S$ of the load-sensing valve 7. As the engine rotation number N decreases from the high idling rotation number $N_H$ to the low idling rotation number $N_L$, the basic control output value C1 increases so that the control pressure $P_C$ increases, and accordingly, the target differential pressure $\Delta P$ decreases. The target differential pressure $\Delta P$ at a time of low idling rotation is defined as a minimum target differential pressure $\Delta P_{MIN}$.

FIG. 5 is a diagram showing an effect of the "speed reducing control" that appears in the supply flow rate characteristics of the hydraulic actuators in accordance with a change in the engine rotation number. This diagram is on the assumption of a work state in which two hydraulic actuators (herein, the boom cylinder 20 and the revolving motor 25) having different required flow rates are operated alternately (that is, each of them is operated solely). Illustrated are a graph of the pump supply flow rate Qb in a case of driving the boom cylinder 20 whose required flow rate is high and a graph of the supply flow rate Qs in a case of driving the revolving motor 25 whose required flow rate is low. Also illustrated is a graph of the maximum ejection flow rate $Q_{P\ MAX}$, similarly to FIG. 3. They are values obtained when the operation amounts on the respective operation levers 30a, 35a are maximum (when spool strokes S of the respective direction control valves 30, 35 are the maximum values $S_{MAX}$), that is, when their required flow rates $Qb_R$, $Qs_R$ are maximum. The inclination angle of the movable swash plate 1a is represented as $\Theta_{NH}$ at a time of high idling rotation, and as $\Theta_{NL}$ at a time of low idling rotation, as mentioned above.

At a time of high idling rotation (N=$N_H$), the basic control output value C1 for the pump control proportional valve 8 is the minimum value $C1_0$, and thus no control pressure $P_C$ is applied to the load-sensing valve 7 (that is, the target differential pressure $\Delta P$ is the specified differential pressure $\Delta P_0$). For each actuator, therefore, the movable swash plate 1a is controlled with the target supply/required flow rate ratio Rq=1. Accordingly, as in the case of high idling rotation described with reference to FIG. 3, when the boom cylinder 20 is driven, the movable swash plate 1a reaches the inclination angle $\Theta b1$ so that the supply flow rate $Qb_H$ satisfies the required flow rate $Qb_R$ ($Qb_H=Qb_R$), to drive the boom 16 at its maximum speed, whereas when the revolving motor 25 is driven, the movable swash plate 1a reaches the inclination angle $\Theta s1$ so that the supply flow rate $Qs_H$ satisfies the required flow rate $Qs_R$ ($Qs_H=Qs_R$), to revolve the revolving base 12 at its maximum speed.

At a time of low idling rotation (N=$N_L$), on the other hand, the basic control output value C1 for the pump control proportional valve 8 is $C1_{MAX}$ which is greater than the minimum value $C1_0$, and thus a control pressure $P_C$ is applied to the load-sensing valve 7, so that the target differential pressure $\Delta P$ is [the specified differential pressure $\Delta P_0$–the control pressure $P_C$], which is lower than the target differential pressure $\Delta P$ at a time of high idling rotation. Accordingly, the target supply/required flow rate ratio Rq of each actuator is set to a value smaller than 1 which is the target value at a time of high idling rotation. Here, RqL=$N_L$/$N_H$ is set, where RqL is the target supply/required flow rate ratio Rq at a time of low idling rotation. Thus, when the boom cylinder 20 is driven, the inclination angle $\Theta_{NL}$ of the movable swash plate 1a is kept as low as $\Theta b2$, so that the supply flow rate $Qb_L$ for turning decreases $Qb_R \times N_L/N_H$. On the other hand, when the revolving motor 25 is driven, the inclination angle $\Theta_{NL}$ of the movable swash plate 1a would be able to reach $\Theta s2$ if the speed reducing control was not performed, but actually, the inclination angle $\Theta_{NL}$ is kept as low as $\Theta s3$ which is lower than $\Theta s2$, so that the supply flow rate $Qs_L$ decreases $Qs_R \times N_L/N_H$. In this manner, for both the boom cylinder 20 and the revolving motor 25, the supply flow rates Q decrease at the same ratio along with a decrease in the engine rotation number from the high idling rotation number to the low idling rotation number, and the driving speeds of the boom cylinder 20 and the revolving motor 25 also decrease at the same ratio.

In a case of driving the engine E with an arbitrary engine rotation number $N_M$ intermediate between the high idling rotation number $N_H$ and the low idling rotation number $N_L$, the target supply/required flow rate ratio Rq in driving each actuator is set to $N_M/N_H$. The arbitrary engine rotation number $N_M$ is a numerical value that decreases toward the low idling rotation number $N_L$. Thus, as the engine rotation number N decreases toward the low idling rotation number $N_L$, the target supply/required flow rate ratio Rq in driving each actuator decreases.

Setting the target supply/required flow rate ratio Rq corresponding to the arbitrary engine rotation number $N_M$ to $N_M/N_H$ is one example of causing a decrease in the supply flow rate Q in driving each actuator, which occurs along with a decrease in the target engine rotation number N, to be according to a decrease in the engine rotation number. Other numerical values may be set. The important thing is that the target supply/required flow rate ratio Rq decreases along with a decrease in the target engine rotation number N from the high idling rotation number $N_H$, and that each time each actuator is operated, the effect of decreasing the target supply/required flow rate ratio Rq in accordance with a decrease in the engine rotation number can be obtained for all the actuators.

In the case described with reference to FIG. 3, for the boom cylinder 20 whose required flow rate $Qb_R$ with the boom operation lever 30a operated to the maximum operation amount is high, the target differential pressure $\Delta P$ is not changed (the target supply/required flow rate ratio Rq=1 is maintained) even though the engine rotation number is changed. In this case, a decrease in the supply flow rate Qb along with a decrease in the engine rotation number N is almost attributable to a decrease in the maximum ejection flow rate $Q_{P\ MAX}$ along with the degrease in the engine rotation number N. Referring to FIG. 5, it can be seen that: if the supply flow rate Qb for the boom cylinder 20 with the boom operation lever 30a operated to the maximum operation amount is set to $Qb_R \times N_M/N_H$ so as to correspond to the arbitrary engine rotation number $N_M$, a decrease in the supply flow rate Qb along with a decrease in the engine rotation number roughly follows a decrease in the maximum ejection flow rate $Q_{P\ MAX}$.

In the case described with reference to FIG. 3, for the revolving motor 25 whose required flow rate $Qs_R$ with the revolving operation lever 35a operated to the maximum operation amount is low, the target differential pressure $\Delta P$ is not changed (the target supply/required flow rate ratio Rq=1 is maintained) even though the engine rotation number is changed. In this case, the supply flow rate Qs is kept at a value that satisfies the required flow rate $Qs_R$ over the entire region of the engine rotation number N from the high idling rotation number $N_H$ to the low idling rotation number $N_L$. Referring to FIG. 5, it can be seen that: if the supply flow rate Qs for the revolving motor 25 with the revolving operation lever 35a operated to the maximum operation amount is set to $Qs_R \times N_M/N_H$ so as to correspond to the arbitrary engine rotation number $N_M$, the supply flow rate Qs decreases along with a decrease in the engine rotation number, and the decrease in the supply flow rate Qs is according to the decrease in the engine rotation number.

The effect of decreasing the target supply/required flow rate ratio Rq by increasing the basic control output value C1 shown in FIG. 4(a) along with a decrease in the engine rotation number is, in appearance, significantly exerted for an actuator required flow rate is low, because a supply flow rate for such an actuator decreases though it has been conventionally kept to satisfy a required flow rate even at a time of low-speed rotation of the engine. The effect is not obviously exerted for an actuator whose required flow rate is high, because a decrease in a supply flow rate for such an actuator along with a decrease in the engine rotation number is similar to a decrease in the maximum ejection flow rate $Q_{P\ MAX}$. The fact, however, remains that the effect of controlling the basic control output value C1, the control pressure $P_C$, and the target differential pressure $\Delta P$ shown in FIG. 4(a) to FIG. 4(c) in accordance with a change in the engine rotation number can also be obtained for a hydraulic actuator whose required flow rate is high, such as the boom cylinder 20. Thus, for every actuator, the effect of decreasing the driving speed of the actuator by decreasing the target supply/required flow rate ratio Rq in accordance with the engine rotation number can be obtained upon driving the actuator.

Consequently, for all the actuators, a phenomenon is avoided that: with lever positions of the actuators unchanged, the driving speeds of the actuators decrease uniformly (for example, according to a decrease in the engine rotation number) along with a decrease in the engine rotation number, to make the operator feel as if driving of one actuator is relatively high as compared to another actuator while the engine is driven with a low engine rotation number.

For an actuator whose required flow rate is low, such as the revolving motor 25, the speed of the actuator can be minutely adjusted by changing the engine rotation number, which is impossible if the target supply/required flow rate ratio Rq is fixed to 1.

Regarding the speed reducing control in accordance with a change in the engine rotation number, FIG. 6 shows characteristics of the required flow rate $Q_R$ and the supply flow rate Q relative to a lever operation amount on a certain hydraulic actuator, that is, relative to a spool stroke S of a direction control valve of the actuator.

The required flow rate $Q_R$ increases as the spool stroke S increases, and reaches a maximum value $Q_{P\ MAX}$ when the spool stroke S is a maximum stroke $S_{MAX}$. Without any control output under the speed reducing control, as in the case of high idling rotation, the supply/required flow rate ratio is 1 so that a supply flow rate $Q_H$ is coincident with the required flow rate $Q_R$, unless the required flow rate $Q_R$ exceeds the maximum pump ejection flow rate $Q_{P\ MAX}$.

On the other hand, a supply flow rate $Q_L$ at a time of low idling rotation has a value obtained by multiplying the required flow rate $Q_R$ by a constant ratio (in the above embodiment, $N_L/N_H$) less than 1, because of the speed reducing control effect. That is, when the spool stroke S is the maximum stroke $S_{MAX}$, $Q_{L\ MAX}=Q_{R\ MAX}\times N_L/N_H$ is established. This correspondence relation is maintained irrespective of a state of the operation amount (spool stroke S). Even under the speed reducing control, the pump supply flow rate $Q_L$ at a time of low idling rotation increases along with an increase in the lever operation amount, and the operating speed of the actuator also increases.

The revolving excavator work machine 10 further performs the speed reducing control of the hydraulic actuator based on a detected engine output environment state quantity. This is described with reference to FIG. 7 to FIG. 9.

FIG. 7 describes the structure of the controller 50 in detail.

As described above, in the controller 50, the load-sensing control unit 51 and an engine speed-sensing control unit 54 are structured.

As described hereinabove, the basic control output value map M1 as shown in FIG. 4(a) is stored in the load-sensing control unit 51. This map M1 is for determining the basic control output value C1 in accordance with the target engine rotation number N, for the purpose of performing "speed reducing control" such that the driving speed of every actuator decreases at a uniform decrease rate according to a decrease in the engine rotation number.

The load-sensing control unit 51 is configured to correct the basic control output value C1 when the revolving excavator work machine 10 is operated in a specific work environment (hereinafter, referred to as "engine output decreasing environment") where a problem related to the engine drive state (engine stall and the like) easily takes place. Through a pump control suitable to the engine output decreasing environment, which can be performed by correcting the basic control output value C1 as described, problems predictable in the work environment can be suppressed or reduced, or kept from developing into a serious situation.

As means for correcting the basic control output value C1, the load-sensing control unit 51 stores a correction amount map M2, and a correction rate map M3. The correction amount map M2 is for determining a basic correction amount α1 according to the target engine rotation number N. The correction rate map M3 is for determining a correction rate β according to the engine output environment state quantity. The basic correction amount α1 determined by the correction amount map M2 is multiplied by the correction rate β.

In a case where a change in the specific environment state quantity causes a decrease in the engine output (i.e., causes the engine output decreasing environment), such an environment state quantity is regarded as the "engine output environment state quantity". Further, a state where the engine output environment state quantity is a reference value is regarded as "reference environment condition".

The correction amount map M2 is configured, assuming the reference environment condition, to achieve an optimum pump ejection amount characteristic in the reference environment condition. For example, as in the later-described examples, where the engine output decreasing environment is assumed to be a high-altitude environment, the correction amount map M2 is configured assuming that a work is performed at a certain altitude (an altitude of 2000 m for example). On the other hand, where the engine output decreasing environment is assumed to be a high temperature environment, the correction amount map M2 is configured to be performed in an environment where the external air temperature is high (e.g., 40° C.).

The engine output environment state quantity is preferably directly connected to the decrease in the engine output of the revolving excavator work machine 10 as much as possible in the engine output decreasing environment. For example, as in the later-described examples, the engine output environment state quantity is the atmospheric pressure if the engine output decreasing environment is a high-altitude environment, and is the engine intake air temperature if the engine output decreasing environment is a high temperature environment.

That is, the correction amount map M2 is configured to determine the basic correction amount α1 to be added to the basic control output value C1, assuming that the engine output environment state quantity is the reference value. In cases where the engine output decreasing environment is a high-altitude environment, the reference value is, for example, the value of the atmospheric pressure at the above-mentioned altitude of 2000 m (later-described reference high-altitude atmospheric pressure APs), and the correction amount map M2 is configured assuming that the atmospheric pressure is that reference value. In cases where the engine output decreasing environment is a high temperature environment, the reference value is, for example, the value of the engine intake air temperature expected with the above-mentioned external air environment of 40° C. (later-described reference high intake air temperature Ts), and the correction amount map M2 is configured assuming that the engine intake air temperature is that reference value.

The correction rate β determined by using the correction rate map M3 serves as a coefficient for increasing or decreasing the basic correction amount α1 corresponding to the engine output environment state quantity determined by using the correction amount map M2, in accordance with the actual engine output environment state quantity. This way, a correction amount to be added to the basic control output value C1 corresponds to the actual engine output environment state quantity.

As input means to the load-sensing control unit 51, a setting mode detection unit 61, a target engine rotation number detection unit 62, and an engine output environment state quantity detection unit 63 are provided.

The setting mode detection unit 61 detects which work mode is set, out of several working modes related to driving of the hydraulic actuator in the revolving excavator work machine 10, and generates a set-mode signal S1 indicating the set working mode, and enters this signal into the load-sensing control unit 51. The work modes include a mode that is set by turning on a single switch, as well as a mode that is set by a combination of operations of several switches. In FIG. 7, however, these switches are combined as the setting mode detection unit 61.

Note that conceivable examples of the above-described work mode include a normal mode, a fuel saving mode, a low-speed traveling mode, and the like. The normal mode is set during normal excavation work or when traveling on a road, and the like. This mode is usually set when the hydraulic actuator is driven in a state where the movable swash plates 23a, 24a of the traveling motors 23, 24 are arranged at a small inclination angle (small capacity) position (normal speed position). The low-speed traveling mode is set at a time of actually traveling while the movable swash plates 23a, 24a are arranged at a large inclination angle (large capacity) position (low speed position). The fuel saving mode is set at a time of working while the engine highest (high idling) rotation number is reduced at a predetermined ratio.

To achieve pump control suitable for each of these work modes, the load-sensing type pump control system 5 selects the maps M1, M2, M3 respectively from groups of maps each of which is a collection of individual maps corresponding to the work mode. That is, in the load-sensing control unit 51, one set of the maps M1, M2 and M3 is selected from the groups of maps according to the set mode indicated by the set-mode signal S1 input.

The target engine rotation number detection unit 62 is configured to detect the target engine rotation number N based on the opening degree of the engine throttle and an operation amount of the accelerator lever (pedal), and the like, generate a target engine rotation number signal S2 indicating the target engine rotation number N detected, and enter the target engine rotation number signal S2 to the load-sensing control unit 51.

When the target engine rotation number signal S2 is input, the target engine rotation number N indicated by the target engine rotation number signal S2 is applied to the basic control output value map M1 and the correction amount map M2 in the load-sensing control unit 51 so as to determine the basic control output value C1 based on the basic control output value map M1, and the basic correction amount $\alpha 1$ is determined based on the correction amount map M2.

The engine output environment state quantity detection unit 63 is configured to detect the engine output environment state quantity indicating the actual engine output decreasing environment described hereinabove, generate an engine output environment state signal S3 indicating the engine output environment state quantity detected, and enter the engine output environment state signal S3 to the load-sensing control unit 51.

When the engine output environment state signal S3 is input, the engine output environment state quantity which is the input signal value is applied to the correction rate map M3 in the load-sensing control unit 51, and the correction rate $\beta$ is determined based on the correction rate map M3.

As a calculator, the load-sensing control unit 51 includes a multiplier 52 and an adder 53. The multiplier 52 is configured to multiply the basic correction amount $\alpha 1$ determined based on the correction amount map M2 by the correction rate $\beta$ determined based on correction rate map M3, thereby calculating a correction amount $\alpha 2$ ($=\alpha 1 \times \beta$). The adder 53 is configured to add this correction amount $\alpha 2$ to the basic control output value C1, thereby calculating the pump ejection amount control output value C2 ($=C1+\alpha 2$). This pump ejection amount control output value C2 is output from the load-sensing control unit 51.

On the other hand, an engine speed-sensitive control unit 54 is configured to lower the ejection flow rate $Q_P$ of the hydraulic pump 1, upon detection of the actual engine rotation number Nr being lower than the later-described reference rotation number Ns, so as to avoid an engine stall and to match the actual engine rotation number Nr with the reference rotation number Ns.

That is, the load-sensing control unit 51 is configured to generate the pump ejection amount control output value C2 based on the target engine rotation number N indicated by the target engine rotation number signal S2 from the target engine rotation number detection unit 62, in order to set an optimum pump ejection flow rate $Q_P$ for driving the hydraulic actuator at a time of driving of the hydraulic actuator. The engine speed-sensitive control unit 54, on the other hand, is configured to generate a speed-sensitive control output value C3 for reducing the pump ejection flow rate $Q_P$ to avoid the risk when the engine rotation number actually decreases.

As input means, the engine speed-sensitive control unit 54 includes an actual engine rotation number detection unit 64 and a reference rotation number detection unit 65. From the actual engine rotation number detection unit 64, an actual engine rotation number signal S4 indicating the actual engine rotation number Nr detected is input.

The reference rotation number detection unit 65 is provided with a map of the reference rotation number Ns serving as a criterion for determining how much decrease in the target engine rotation number N detected by the target engine rotation number detection unit 62 triggers the engine speed-sensitive control unit 54 to generate the speed-sensitive control output value C3, i.e., a criterion for determining the start of the engine speed-sensitive control. Therefore, when the target engine rotation number N detected by the target engine rotation number detection unit 62 is input to the load-sensing control unit 51, the reference rotation number Ns suitable for the target engine rotation number N is determined by the reference rotation number detection unit 65, and a reference rotation number signal S5 indicating the reference rotation number Ns is input to the engine speed-sensitive control unit 54.

The engine speed-sensitive control unit 54 is provided with a subtractor 55 and a PID control unit 56. From the reference rotation number Ns indicated by the reference rotation number signal S5, the subtractor 55 subtracts the actual engine rotation number Nr indicated by the actual engine rotation number signal S4 to calculate a rotation-down amount (differential rotation number) Nd ($=Ns-Nr$). The rotation-down amount Nd is input to the PID control unit 56, and the PID control unit 56 determines whether or not the speed-sensitive control output value C3 of the engine speed-sensitive control should be generated, based on the rotation-down amount Nd input, and if it is determined that the speed-sensitive control output value C3 should be generated, the PID control unit 56 determines what value the speed-sensitive control output value C3 should be.

Namely, while the actual engine rotation number Nr is more than the reference rotation number Ns, and the rotation-down amount Nd is a negative value, the speed-sensitive control output value C3 is not generated (C3=0). When the actual engine rotation number Nr is lower than the reference rotation number Ns, and the rotation-down amount Nd is a positive value, the speed-sensitive control output value C3 corresponding to that positive value is generated.

When the speed-sensitive control output value C3 is output from the engine speed-sensitive control unit 54, the speed-sensitive control output value C3 is input to the adder 57 to which the pump ejection amount control output value C2 from the load-sensing control unit 51 is input. The adder 57 adds the pump ejection amount control output value C2 from the load-sensing control unit 51 and the speed-sensitive control output value C3 from the engine speed-sensitive control unit 54, to calculate a command current value C4.

This command current value C4 is input to a linearization map M4 stored in the controller 50 and linearized, and eventually used to generate a command current Ce which is suitable for applying to the solenoid 8a of the pump control proportional valve 8.

Next, the following describes examples in relation to the configuration of the load-sensing control unit 51 of the controller 50 described above.

Figure 8:
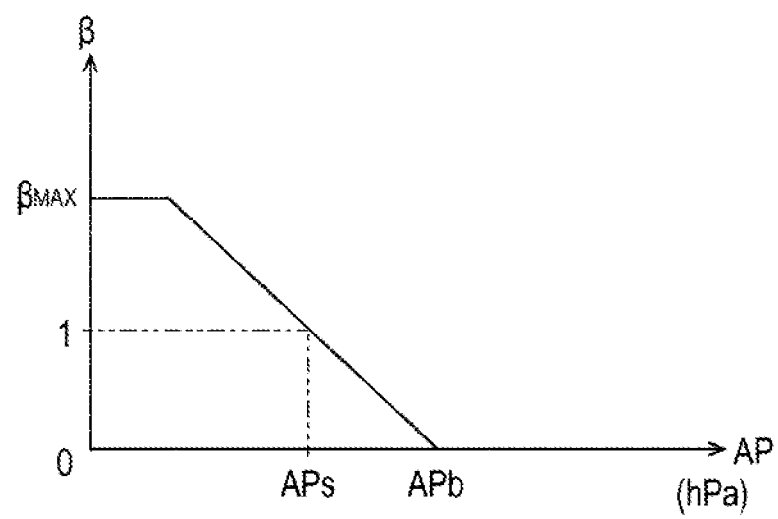
FIG. 8 A graph of a correction rate map for determining a correction rate according to an atmospheric pressure, in relation to a first embodiment.

First, the following describes, with reference to FIG. 7 and FIG. 8, a configuration of the load-sensing control unit 51, in a case where the engine output decreasing environment is a high-altitude environment.

First, in a high-altitude environment, there is the following problem. Namely, an air-intake amount of the engine decreases due to a low atmospheric pressure (a low air density in the atmosphere), which causes a decrease in the engine output. Driving the hydraulic actuator at high speeds in such a circumstance leads to a significant decrease in the engine rotation number and an engine stall.

An influence of a decrease in the engine output becomes more conspicuous in a vicinity of the low idling rotation number. Therefore, to avoid an engine stall and the like, a conceivable approach is to set the low idling rotation number higher in the high-altitude environment. This, however, causes more noise than a case of working in a low altitude environment with the engine rotation number set to the low idling rotation number.

In view of this, by using the load-sensing type pump control system 5, the target supply/required flow rate ratio Rq of the hydraulic actuator corresponding to each engine rotation number is set smaller than that set in the "speed reducing control", so as to reduce the absorption horsepower of the hydraulic pump to suppress or reduce a problem such as an engine stall caused by insufficient power of the engine. At the same time, a noise-causing increase in the low idling rotation number is made unnecessary. Therefore, quiet and comfortable work environment can also be maintained.

A high-altitude environment can be an example of the engine output decreasing environment. The following describes how the engine output environment state quantity detection unit 63, the correction amount map M2 and the correction rate map M3 for correcting the basic control output value C1 should be configured in such a case.

First, an essential problem in work at a high-altitude is a decrease in the engine output due to a low atmospheric pressure, as hereinabove described. Therefore, in this case, it is the atmospheric pressure that is most suitable as the engine output environment state quantity, which is a numerical value indicating the actual state of the engine output decreasing environment.

In this embodiment, it is conceivable to adopt an atmospheric pressure sensor as the engine output environment state quantity detection unit 63 shown in FIG. 7. In this case, the engine output environment state signal S3 is a signal indicating the value of the atmospheric pressure AP (unit: hPa) detected by the engine output environment state quantity detection unit 63 serving as an atmospheric pressure sensor. Then, the correction rate map M3 for determining the correction rate according to the engine output environment state quantity is a correlation map of the correction rate β with respect to the atmospheric pressure AP (unit: hPa), as shown in FIG. 8.

The basic control output value map M1 stored in the load-sensing control unit 51 is configured to correspond to a work in a low altitude environment (i.e., under the atmospheric pressure predictable in the low altitude environment) where the work efficiency is most favorable.

Although the atmospheric pressure decreases with an increase in altitude, no particular correction is needed for a decrease in the atmospheric pressure within a certain range of altitude from the low altitude environment (low altitude ground) and there will be no significant problem in using the basic control output value C1 determined with reference to the basic control output value map M1 as it is, as the pump ejection amount control output value C2 output from the load-sensing control unit 51. The value of the atmospheric pressure estimated at an altitude which is the upper limit of the range of the altitude is a boundary atmospheric pressure APb.

The correction rate map M3 is configured in such a manner that the correction rate β is zero within a range in which the atmospheric pressure AP is equal to or higher than the boundary atmospheric pressure APb. Therefore, the correction amount α2 calculated by the multiplier 52 is 0. Therefore, the pump ejection amount control output value C2 calculated by the adder 53 stays the basic control output value C1. Hence, a pump control effect with a maximized work efficiency, suitable for work in a low altitude environment can be achieved.

On the other hand, a problem of insufficient engine output starts to take place, when the altitude of the work site exceeds the upper limit of the altitude (the altitude where the atmospheric pressure is assumed to be the boundary atmospheric pressure APb), and the level of negative influence from such a problem increases with a decrease in the atmospheric pressure associated with an increase in the altitude. In view of this, the correction rate map M3 is configured so that the correction rate β of zero for the boundary atmospheric pressure APb increases with a decrease in the atmospheric pressure AP from the boundary atmospheric pressure APb.

The correction amount map M2 of this embodiment is described below. In this embodiment, a typical high-altitude environment where the above described problem takes place (hereinafter, "reference high-altitude"; e.g., a high altitude of 2000 m) is estimated. The correction amount map M2 is configured by taking into account how much basic correction amount α1 needs to be added to the basic control output value C1 in order to achieve a most favorable pump control, at a time of working under the atmospheric pressure in such a work site at the reference high-altitude. The value of the atmospheric pressure as the reference value of the engine output environment state quantity estimated in configuring the correction amount map M2 is referred to as reference high-altitude atmospheric pressure APs Therefore, if the atmospheric pressure AP measured by the atmospheric pressure sensor serving as the engine output environment state quantity detection unit 63 equals to the reference high-altitude atmospheric pressure APs, the basic correction amount α1 determined at that time based on the correction amount map M2 is preferably added as it is to the basic control output value C1.

In view of this, in the correction rate map M3, the correction rate β corresponding to the reference high-altitude atmospheric pressure APs is 1 (β=1). Therefore, if the atmospheric pressure AP measured by the engine output environment state quantity detection unit 63 is the reference high-altitude atmospheric pressure APs, the correction amount α2 calculated by the multiplier 52 remains the basic correction amount $\alpha 1$ determined based on the correction amount map M2 ($\alpha 2 = \alpha 1 \times 1 = \alpha 1$), and the adder 53 calculates the pump ejection amount control output value C2 which is a value resulting from an addition of the correction amount $\alpha 2$ to the basic control output value C1.

That is, as is seen in the correction rate map M3, the correction rate $\beta$ is more than 0 but less than 1 ($0 < \beta < 1$) until the atmospheric pressure AP less than the boundary atmospheric pressure APb reaches the reference high-altitude atmospheric pressure APs, and the correction amount $\alpha 2$ ($= \alpha 1 \times \beta$) is smaller than the basic correction amount $\alpha 1$ determined based on the correction amount map M2. In other words, this range corresponds to a medium-high altitude which is a high altitude relatively close to a low altitude, and the operating speed of the hydraulic actuator in the medium-high altitude is slightly lower than the speed in a low altitude.

When the atmospheric pressure AP drops to a value lower than the reference high-altitude atmospheric pressure APs, the correction rate $\beta$ is more than 1 ($\beta > 1$), and the correction amount $\alpha 2$ ($= \alpha 1 \times \beta$) is amplified to a value greater than the basic correction amount $\alpha 1$ determined based on the correction amount map M2. In other words, this range corresponds to a high altitude exceeding the reference high-altitude, and the operating speed of the hydraulic actuator at such a high altitude is significantly lower than the speed in a low altitude. This way, an engine stall and noises can be avoided even during work under such a significantly lowered atmospheric pressure.

While the engine E is driven to perform work with the revolving excavator work machine 10 (while traveling), detection of the atmospheric pressure AP is continued, and calculation of the correction amount $\alpha 2$ based on the measured value is continued. In a mountain region, the atmospheric pressure is likely to change during traveling. Therefore, by continuing calculation of the correction amount $\alpha 2$, a most favorable pump ejection flow rate control is conducted in response to every change in the atmospheric pressure.

In the correction rate map M3 shown in FIG. 8, a maximum value $\beta_{MAX}$ of the correction rate $\beta$ is determined to avoid an extreme drop in the driving speed of the hydraulic actuator, i.e., to obtain at least a minimum driving speed of the hydraulic actuator. However, such a maximum value $\beta_{MAX}$ does not necessarily have to be determined. The correction rate $\beta$ may be increased to a value such that the driving speed of the hydraulic actuator is close to zero. Further, although the correction rate map M3 in FIG. 8 is a graph with straight lines (line graph), and the correction rate $\beta$ proportionally increases with a drop in the atmospheric pressure AP below the boundary atmospheric pressure APb, the correction rate $\beta$ does not necessarily have to be drawn in this manner, and changes in the correction rate $\beta$ may be drawn in the form of using a curved line.

Further, in a case where the engine output decreasing environment is a high altitude environment, a value other than the measured value of the atmospheric pressure may be used as the measured value of the engine output environment state quantity. Conceivable examples include a measured value of a pressure such as an air intake pressure of the engine E measured by a pressure gage (pressure sensor).

Figure 9:
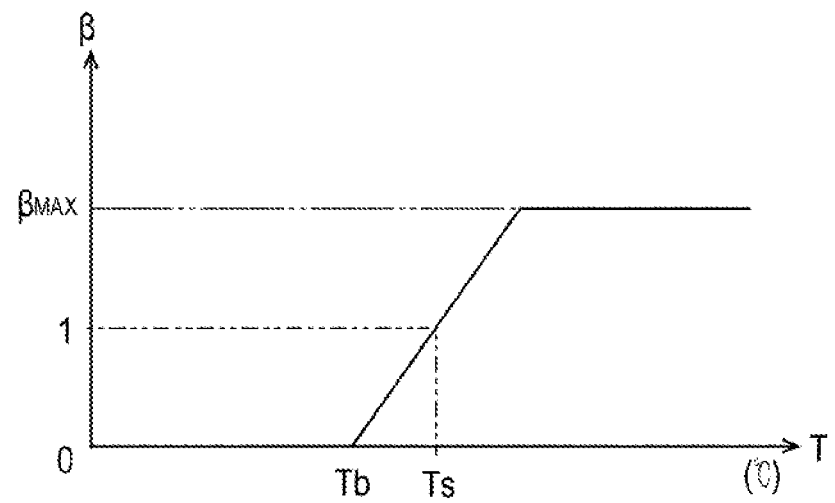
FIG. 9 A graph of a correction rate map for determining a correction rate according to an engine intake air temperature, in relation to a second embodiment.

Next, as a second embodiment, the following describes, with reference to FIG. 7 and FIG. 9, a configuration of the load-sensing control unit 51, in a case where the engine output decreasing environment is a high temperature environment, such as a tropical zone, a desert area, or a summertime.

A problem in working in a high temperature environment is that a decrease in the air density due to a high temperature results in a reduced amount of oxygen introduced into cylinders of the engine, which leads to a drop in the engine output and resulting in an engine stall.

Therefore, in such a high temperature environment too, the problem of an engine stall and the like which may take place under the engine output decreasing environment can be suppressed or reduced by lowering the driving speed of the hydraulic actuator through the "speed reducing control" by the load-sensing type pump control system 5.

In this case, particularly, an intake air temperature of an engine air-intake manifold and the like is used as the engine output environment state quantity, and the engine output environment state quantity detection unit 63 is configured by using a temperature sensor configured to detect the intake air temperature. The intake air temperature is a temperature, out of those in the revolving excavator work machine 10, which is easily affected by the external air temperature.

In the present embodiment, the correction amount map M2 for determining the basic correction amount $\alpha 1$ according to the target engine rotation number N is configured assuming an intake air temperature of the engine (reference intake air temperature Ts) as the reference value of the engine output environment state quantity estimated at a work in a typical high temperature environment (reference environment condition), e.g. at a work in an environment with an external air temperature of 40° C.

FIG. 9 shows a correction rate map M3 of this embodiment. In this embodiment, a suitable temperature range is defined for an intake air temperature T to be detected by the engine output environment state quantity detection unit 63. While the intake air temperature T is within this suitable temperature range, addition of the correction amount $\alpha 2$ is not necessary, and the basic control output value C1 is used as it is as the pump ejection amount control output value C2 output from the load-sensing control unit 51. Therefore, the correction rate $\beta$ of the intake air temperature T for this suitable temperature range is zero. An intake air temperature T which is the upper limit of the suitable temperature range is referred to as boundary intake air temperature Tb.

Under a high temperature environment where the intake air temperature T exceeds the boundary intake air temperature Tb, the influence of a decrease in the engine output at a time of driving the revolving excavator work machine 10 becomes conspicuous. Within this temperature region, the correction rate $\beta$ is more than zero, and increases with an increase in the intake air temperature T.

The correction rate $\beta$ is $0 < \beta < 1$ until the intake air temperature T having exceeded the boundary intake air temperature Tb reaches the reference intake air temperature Ts, and the correction amount $\alpha 2$ to be added to the basic control output value C1 is smaller than the basic correction amount $\alpha 1$ determined based on the correction amount map M2. When the intake air temperature T reaches the reference intake air temperature Ts, the correction rate $\beta$ is $\beta = 1$, and the basic correction amount $\alpha 1$ determined based on the correction amount map M2 is added as it is to the basic control output value C1.

By reducing the pump ejection amount as described above during the work in the high temperature environment as the engine output decreasing environment, the load imposed on the engine E for driving the hydraulic pump 1 is reduced and an engine stall is avoided. Detection of the intake air temperature T by the engine output environment state quantity detection unit 63 is continued while the revolving excavator work machine 10 is operated, and based on the intake air temperature T detected, the correction rate β determined based on the correction rate map M3 is updated. This way, the value of the correction rate β can be changed in response to a change in the intake air temperature T associated with a change in the external air temperature, and a pump control corresponding to the lowered engine output can be performed.

In the correction rate map M3 shown in FIG. 9, a maximum value $β_{MAX}$ of the correction rate β is determined to avoid an extreme decrease in the driving speed of the hydraulic actuator, i.e., to obtain a minimum driving speed of the hydraulic actuator. However, such a maximum value $β_{MAX}$ does not necessarily have to be determined. The correction rate β may be increased to a value such that the driving speed of the hydraulic actuator is close to zero. Further, although the correction rate map M3 in FIG. 9 is also a graph with straight lines (line graph), and the correction rate β proportionally changes with a change in the intake air temperature T within the range that falls within the engine output decreasing environment, the correction rate β does not necessarily have to be drawn in this manner, and changes in the correction rate β may be drawn in the form of using a curved line.

Figure 10:
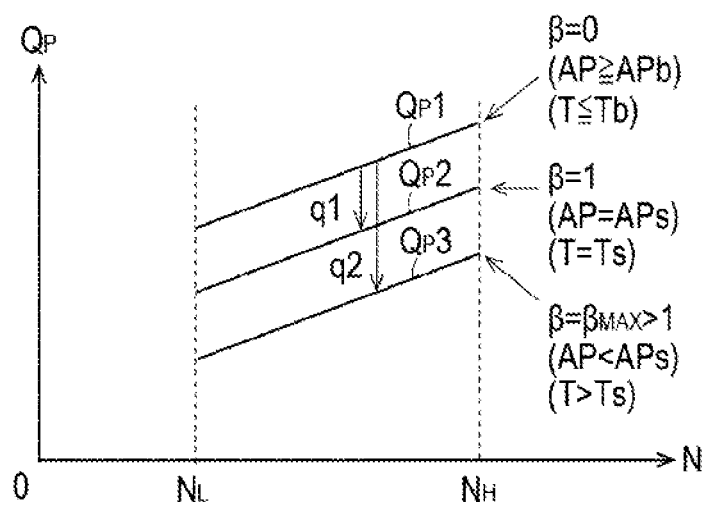
FIG. 10 A graph showing effects on the characteristics of ejection flow rates from the pump, in relation to the first and second embodiments.

Next, the following describes effects of the pump control related to the above-described embodiments, with reference to FIG. 10. FIG. 10 shows an effect in the characteristic of the pump ejection flow rate $Q_P$ with respect to the target engine rotation number N, which effect is achieved by correcting the basic control output value C1 by the load-sensing control unit 51 in accordance with the engine output decreasing environment. It is assumed that there is no output of the speed-sensitive control output value C3 from the engine speed-sensitive control unit 54.

The graph $QP_1$ shows the pump ejection flow rate characteristic obtained when the work environment of the revolving excavator work machine 10 is a normal work environment. In other words, the correction rate β is β=0, and the basic control output value C1 is not corrected. The basic control output value C1 is used as it is as the pump ejection amount control output value C2 which is output from the load-sensing control unit 51, and the ejection flow rate $Q_P$ is maximum even under the above-described speed reducing control.

This is an effect achieved while the engine output environment state quantity is within a range corresponding to the normal work environment. Such a circumstance is a state where the atmospheric pressure AP is equal to or higher than the boundary atmospheric pressure APb (AP≥APb) in the first embodiment, and is a state where the intake air temperature T is within the suitable temperature range and equal to or lower than the boundary intake air temperature Tb (T≤Tb) in the second embodiment.

In the first embodiment, the normal work environment corresponds to a low altitude environment where the atmospheric pressure AP is sufficiently high as described above. In the second embodiment, the normal work environment corresponds to a state where the value of the external air temperature is a suitable external air temperature that does not cause a problem in operation of the revolving excavator work machine 10.

The graph $Q_P2$ shows the pump ejection flow rate characteristic obtained in a case where the correction rate β is 1, and where the value of the basic correction amount α1 determined based on the correction amount map M2 is added as it is to the basic control output value C1, and the pump ejection amount control output value C2 greater than the basic control output value C1 is output from the load-sensing control unit 51. The pump ejection flow rate $Q_P$ is kept lower than that on the graph $Q_P1$. Such a circumstance is a state where the atmospheric pressure AP is equal to the reference high-altitude atmospheric pressure APs (AP=APs) in the first embodiment, and is a state where the intake air temperature T is equal to the reference intake air temperature Ts (T≤Ts) in the second embodiment.

The effect in the pump ejection flow rate characteristic shown in the graph $Q_P2$ is obtained when the revolving excavator work machine 10 under the reference environment condition, which is the engine output decreasing environment serving as the basis for configuring the correction amount map M2. In the first embodiment, the engine output decreasing environment corresponds to a working condition at a high altitude, where the altitude of the work site is the reference high-altitude. In the second embodiment, the engine output decreasing environment corresponds to a high temperature working condition, where the external air temperature causes the intake air temperature T of the engine E to be the reference intake air temperature Ts.

The correction rate β increases within a range of less than 1, while the atmospheric pressure AP increases from the boundary atmospheric pressure APb up to the reference high-altitude atmospheric pressure APs in the first embodiment, or while the intake air temperature T rises from the boundary intake air temperature Tb up to the reference intake air temperature Ts in the second embodiment. Along with the increase the pump ejection flow rate $Q_P$ decreases from the value on the graph $Q_P1$ in the normal work environment to the value on the graph $Q_P2$ showing typical characteristic under the engine output decreasing environment.

Although the engine output environment state quantity within the above ranges belongs to the engine output decreasing environment, the level of the problem that could take place in the operation of the revolving excavator work machine 10 is relatively low. Such a circumstance in the first embodiment corresponds to a working condition at a medium high altitude which is a high altitude environment with a relatively low altitude. In the second embodiment, such a circumstance corresponds to a high temperature environment where the external air temperature is relatively close to a suitable temperature.

The graph $Q_P3$ shows the pump ejection flow rate characteristic when the correction rate β is the maximum value $β_{MAX}$ (>1). That is, the graph shows a minimum value of the pump ejection flow rate $Q_P$ which is reduced based on the engine output environment state quantity detected, and represents a state where the driving speed of the hydraulic actuator is lowered most. This is an engine output decreasing environment with a large level of the engine output environment state quantity which causes problems in the revolving excavator work machine 10. Such a circumstance is a state with a low atmospheric pressure AP which is lower than the reference high-altitude atmospheric pressure APs in the first embodiment, and is a state with a high intake air temperature T which exceeds the reference intake air temperature Ts in the second embodiment.

As a work environment, the above engine output decreasing environment may cause a considerably severe level of problems in the operation of the revolving excavator work machine 10, and corresponds to a working condition in the high altitude environment, where the altitude is extremely higher than the reference high-altitude. In the second embodiment, the environment corresponds to a high temperature environment with an extremely high external air temperature.

In another conceivable example other than the above first and second embodiments, related to the configuration of the engine output environment state quantity detection unit 63, the correction amount map M2, and the correction rate map M3, an "air conditioner load increasing state" is used as the engine output decreasing environment.

Although the load on the air conditioner does not directly affect the engine output, a compressor for the air conditioner is driven by an engine output shaft together with the hydraulic pump 1. Therefore, when the load on the air conditioner increases, the absorption horsepower that can be used in the hydraulic pump 1 is reduced. This affects the hydraulic system of the revolving excavator work machine 10, as in the case of a decrease in the engine output. Therefore, the "air conditioner load increasing state" can be an example of the engine output decreasing environment.

In this case, examples of the state quantity having a strong correlation with the magnitude of the load on the air conditioner include refrigerant pressures at the upstream and downstream of the compressor of the air conditioner. Further, it is not the engine that always drives the compressor of the air conditioner, and ON/OFF is repeated by a clutch. Thus, the engine output environment state quantity includes: an upstream pressure of the compressor of the air conditioner, a downstream pressure of the compressor of the air conditioner, and ON/OFF state of a clutch for driving the air conditioner. The engine output environment state quantity detection unit 63 is configured by an air conditioner compressor upstream pressure sensor, an air conditioner compressor downstream pressure sensor, and a compressor-drive clutch.

In this embodiment, the correction amount map M2 is created based on a reference environment condition where the upstream pressure and the downstream pressure of the compressor of the air conditioner (or a differential pressure between the upstream and the downstream, calculated by using detection values from both sensors) become a certain value, while the compressor-drive clutch is in the ON state. The correction rate map M3 serves as a map showing a change in the correction rate according to a change in the upstream pressure and the downstream pressure (or the differential pressure between the upstream and the downstream) of the compressor of the air conditioner, while the compressor-drive clutch is in the ON state. When the OFF state of the compressor-drive clutch is detected, it is conceivable to set the correction rate β to zero, assuming that the state has departed from the "air conditioner load increasing state" as the engine output decreasing environment.

As hereinabove described, a revolving excavator work machine 10 as an example of a hydraulic machine includes a plurality of hydraulic actuators that are driven by oil ejected from a variable displacement type hydraulic pump 1 driven by an engine. A control device of the revolving excavator work machine 10 includes, as a load-sensing type pump control system 5 serving as means for controlling an ejection amount from the hydraulic pump 1, a load-sensing valve 7 serving as pump control means for controlling the hydraulic pump 1 to achieve a target differential pressure ΔP which is a target value of a differential pressure between an ejection pressure $P_P$ of oil ejected from the hydraulic pump 1 and a maximum load pressure $P_L$ of oil supplied to the hydraulic actuator; and control pressure generating means including a pump control proportional valve 8 serving as an electromagnetic proportional valve and a controller 50, for generating a control pressure $P_C$ for changing the target differential pressure ΔP. The load-sensing type pump control system 5 is configured such that, in driving each hydraulic actuator, a supply flow rate Q of oil ejected from the hydraulic pump 1 is controlled in such a manner that the flow rate of the hydraulic actuator satisfies a required flow rate $Q_R$, a control output is performed to correct a ratio of a supply flow rate Q with respect to the required flow rate Qr of the hydraulic actuator according to a change in engine rotation number N, and a control pressure $P_C$ is generated by the pump control proportional valve 8 to change the target differential pressure ΔP.

The load-sensing type pump control system 5 sets a value of the control output as a basic control output value C1, and generates a control pressure $P_C$ by controlling the pump control proportional valve 8 based on a pump ejection amount control output value C2 obtained by adding a correction amount α2 to the basic control output value C1. In a case where a change in a specific environment state quantity is a factor causing a decrease in an engine output, the environment state quantity is set as an engine output environment state quantity, a state where the engine output environment state quantity is a reference value is set as a reference environment condition. The correction amount α2 is a numerical value obtained by multiplying a basic correction amount α1 determined according to the reference environment condition by a correction rate determined based on a measured value of the engine output environment state quantity.

The load-sensing type pump control system 5 includes: a control output value map M1 for use in determining the basic control output value C1 according to the target engine rotation number N; a correction amount map M2 for use in determining the basic correction amount α1 according to the target engine rotation number N under the reference environment condition; and a correction rate map M3 for determining a correction rate β based on a measured value of the engine output environment state quantity. The load-sensing type pump control system 5 determines the basic control output value C1 and the basic correction amount α1 by applying a set target engine rotation number N to the control output value map M1 and the correction amount map M2, and also determines the correction rate β by applying the measured value of the engine output environment state quantity to the correction rate map M3.

In a first embodiment of the above load-sensing type pump control system 5 (load-sensing control unit 51), the engine output environment state quantity is the atmospheric pressure AP.

Alternatively, in a second embodiment of the above load-sensing type pump control system 5 (load-sensing control unit 51), the engine output environment state quantity is the engine intake air temperature T.

The load-sensing type pump control system 5 controls the flow rate of oil ejected from the hydraulic pump 1, based on detection of a decrease in an actual engine rotation number N. The load-sensing type pump control system 5 controls the pump control proportional valve 8 to generate the control pressure $P_C$ based on a command current value C4 obtained by adding, to the pump ejection amount control output value C2, a speed-sensitive control output value C3 set for controlling the flow rate of the oil ejected from the hydraulic pump 1 based on detection of a decrease in the actual engine rotation number Nr.

With the above-described load-sensing type pump control system 5 of a revolving excavator work machine 10, when the measured value of the engine output environment state quantity is within a range that causes a decrease in engine output, a correction amount α2 determined based on a measured value of the engine output environment state quantity is added to the basic control output value C1, and a control pressure $P_C$ is generated based on a pump ejection amount control output value C2 which is a value surpassing the basic control output value C1. Therefore, the flow rate of oil ejected from the pump corresponds to the state after the decrease in the engine output, and there is no need for changing the rotation number in a low idling rotation of the engine. Hence, the risk of engine stall and the like can be avoided without generating noise.

The correction amount α2 is a value on which the command current Ce is based, as is the case with the basic control output value C1. Regarding determination of this value, it only requires that a device serving as a detecting means for measuring the engine output environment state quantity be provided as needed, in addition to the correction amount map M2 and the correction rate map M3 configured in consideration of the state where the engine output environment state quantity is the reference value. This is more economical, because the above pump control effect can be achieved without a need for adding a particular expensive device. Further cost-cutting can be achieved if a member already provided to the revolving excavator work machine 10 can be used as means for detecting the engine output environment state quantity.

Further, at a time of performing a work with the revolving excavator work machine 10 at a high altitude environment where the atmospheric pressure is low, the configuration of the first embodiment determines the correction rate β and the correction amount α2, based on the measured value of the atmospheric pressure AP which is the engine output environment state quantity, and reduces the flow rate of oil ejected from the pump, according to the state where the engine output is lowered due to the decrease in the atmospheric pressure. Thus, the work can be stably performed while avoiding the above-described problem such as an excessive decrease in the engine rotation number or an engine stall which is likely to occur in the work at a high altitude environment.

Further, at a time of performing a work with the revolving excavator work machine 10 at a high temperature environment, the configuration of the second embodiment determines the correction rate β and the correction amount α2, based on the measured value of the engine intake air temperature T which is the engine output environment state quantity. The flow rate of ejection from the pump is controlled based on the correction rate β and the correction amount α2. Thus, the pump ejection amount is reduced according to the state where the engine output is lowered, during the work in the high temperature environment. Therefore, the driving speed of the hydraulic actuator is suppressed, and a problem such as an excessive decrease in the engine rotation number can be avoided.

Further, by adding a structure to control the flow rate of the oil ejected from the hydraulic pump 1 based on a detected decrease in the actual engine rotation number Nr as described above, an unexpected decrease in the engine rotation number that cannot be coped by the pump control based on the pump ejection amount control output value C2 and the correction amount α2 determined can be addressed. Since the pump control proportional valve 8 is also used in this control according to the decrease in the engine speed, an increase in the costs can be suppressed or reduced.

INDUSTRIAL APPLICABILITY

An embodiment of the present invention is applicable as a control device not only for the revolving excavator work machine described above but also for any hydraulic machine that adopts a load-sensing type hydraulic pump control system.

The invention claimed is:

1. A control device for a hydraulic machine including a plurality of hydraulic actuators that are driven by oil ejected from a variable displacement type hydraulic pump driven by an engine, comprising:

pump control means for controlling the hydraulic pump to achieve a target differential pressure which is a target value of a differential pressure between an ejection pressure of the oil ejected from the hydraulic pump and a load pressure of oil supplied to the hydraulic actuators;

control pressure generating means including an electromagnetic proportional valve for generating a control pressure for changing the target differential pressure, and the control device being configured so that, in driving each of the hydraulic actuators, a flow rate of the oil ejected from the hydraulic pump is controlled in such a manner as to satisfy a required flow rate of the hydraulic actuators, a control output is performed to correct a ratio of a supply flow rate with respect to the required flow rate of the hydraulic actuators according to a change in an engine rotation, and the control pressure is generated by the electromagnetic proportional valve to change the target differential pressure, and wherein:

the control device is configured to set a value of the control output as a basic control output value and generate the control pressure via the electromagnetic proportional valve based on a pump ejection amount control output value obtained by adding a correction amount to the basic control output value, in a case where a change in a specific environment state quantity is a factor causing a decrease in an engine output, the environment state quantity is set as an engine output environment state quantity, a state where the engine output environment state quantity is a reference value is set as a reference environment condition, and the correction amount is a numerical value obtained by multiplying a basic correction amount determined under the reference environment condition by a correction rate determined based on a measured value of the engine output environment state quantity.

2. The control device according to claim 1, further comprising:

a control output value map for use in determining the basic control output value according to a target engine rotation number; a correction amount map for use in determining the basic correction amount according to the target engine rotation number under the reference environment condition; and a correction rate map for determining the correction rate based on the measured value of the engine output environment state quantity, wherein the control device is configured to determine the basic control output value and the basic correction amount by applying a set target engine rotation number to the control output value map and the correction amount map, and also determine the correction rate by applying the measured value of the engine output environment state quantity to the correction rate map.

3. The control device according to claim 1, wherein the engine output environment state quantity is an atmospheric pressure.

4. The control device according to claim 1, wherein the engine output environment state quantity is an engine intake air temperature.

5. The control device according to claim 1, wherein:
the control device is configured to control the flow rate of the oil ejected from the hydraulic pump, based on detection of a decrease in an actual engine rotation number; and
the control device is configured to generate the control pressure based on a value obtained by adding, to the pump ejection amount control output value, a speed-sensitive control output value set for controlling the flow rate of the oil ejected from the hydraulic pump based on the detection of the decrease in the actual engine rotation number.

* * * * *